United States Patent
Li et al.

(10) Patent No.: US 11,943,797 B2
(45) Date of Patent: Mar. 26, 2024

(54) INTER-NODE COORDINATION FOR CROSS-LINK INTERFERENCE MANAGEMENT

(71) Applicant: Telefonaktiebolaget LM Ericsson (PUBL), Stockholm (SE)

(72) Inventors: Jingya Li, Gothenburg (SE); Sebastian Faxér, Stockholm (SE); Mårten Sundberg, Årsta (SE); Petter Ersbo, Knivsta (SE); Naga Vishnu Kanth Irukulapati, Västra Frölunda (SE); Filip Barac, Huddinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 177 days.

(21) Appl. No.: 17/420,753

(22) PCT Filed: Dec. 20, 2019

(86) PCT No.: PCT/SE2019/051336
§ 371 (c)(1),
(2) Date: Jul. 6, 2021

(87) PCT Pub. No.: WO2020/145867
PCT Pub. Date: Jul. 16, 2020

(65) Prior Publication Data
US 2022/0110136 A1 Apr. 7, 2022

Related U.S. Application Data

(60) Provisional application No. 62/806,222, filed on Feb. 15, 2019, provisional application No. 62/791,070, filed on Jan. 11, 2019.

(51) Int. Cl.
*H04W 72/04* (2023.01)
*H04B 17/345* (2015.01)
*H04W 72/542* (2023.01)

(52) U.S. Cl.
CPC ........ *H04W 72/542* (2023.01); *H04B 17/345* (2015.01)

(58) Field of Classification Search
CPC ... H04B 17/345; H04L 5/0023; H04L 5/0048; H04L 5/0092; H04L 5/1461;
(Continued)

(56) References Cited

U.S. PATENT DOCUMENTS

| | | | |
|---|---|---|---|
| 2017/0019909 A1* | 1/2017 | Si | H04W 72/02 |
| 2018/0367289 A1* | 12/2018 | Kim | H04L 5/0096 |
| 2021/0321281 A1* | 10/2021 | Wei | H04B 17/336 |

FOREIGN PATENT DOCUMENTS

| | | |
|---|---|---|
| CN | 104285389 A | 1/2015 |
| CN | 108282879 A | 7/2018 |

(Continued)

OTHER PUBLICATIONS

3GPP TSG RAN WG1 NR Ad-Hoc Meeting; Spokane, USA; Source: CATT; Title: Interference management for dynamic TDD and flexible duplex (R1-1700212)—Jan. 16-20, 2017.
(Continued)

*Primary Examiner* — Phuc H Tran
(74) *Attorney, Agent, or Firm* — BAKER BOTTS L.L.P.

(57) ABSTRACT

Embodiments include exemplary methods for CLI mitigation. The methods comprise receiving (1310), from at least one sending network node, a TDD configuration of the at least one sending network node, the TDD configuration identifying at least one slot of the TDD configuration as either a fixed uplink slot or a fixed downlink slot, and at least one slot of the TDD configuration as a flexible slot for which at least one symbol has an undefined transmission direction and the remaining symbols of the slot, if any, have a defined transmission direction. The methods also comprise adapting (1320) operations in a cell based on the received TDD (Continued)

configuration for mitigating CLI with the at least one sending network node. Embodiments also include network nodes configured to perform the exemplary methods and/or procedures.

17 Claims, 10 Drawing Sheets

(58) Field of Classification Search
CPC ........... H04L 5/1469; H04W 72/0446; H04W 92/20; H04W 72/27; H04W 72/542
See application file for complete search history.

(56) References Cited

FOREIGN PATENT DOCUMENTS

| | | |
|---|---|---|
| RU | 2 463 714 C2 | 10/2012 |
| WO | 2009 070614 A2 | 6/2009 |
| WO | 2012 061325 A1 | 10/2011 |
| WO | 2014 189913 A1 | 11/2014 |
| WO | 2015 014207 A1 | 2/2015 |
| WO | 2015 044405 A1 | 4/2015 |
| WO | 2018 172620 A1 | 9/2018 |

OTHER PUBLICATIONS

3GPP TSG RAN WG1 #90, Prague, Czech Republic, 6.1.3.1.4.2; WF on SFI; LGE, Panasonic, CATT, . . . (R1-1715081)—Aug. 26, 2017.
3GPP TSG RAN WG1 #91; Reno, Nevada, USA; Source: TCL Communication; Title: Dynamic TDD—SFI Handling and Interference Management (R1-1719706)—Nov. 27-Dec. 1, 2017.
3GPP TSG RAN WG1 Meeting Ad-Hoc Meeting 1901; Taipei, Taiwan; Source: Ericsson; Title: On network coordination mechanisms for CLI mitigation (R1-1900759)—Jan. 21-25, 2019.
3GPP TSG-RAN WG2 Meeting #101; Sanya, China; Source: Nokia, Nokia Shanghai Bell; Title: Clarifications to the NR TDD configuration (R2-1804772)—Apr. 16-20, 2018.
PCT International Search Report issued for International application No. PCT/SE2019/051336—dated Mar. 4, 2020.
PCT Written Opinion of the International Searching Authority issued for International application No. PCT/SE2019/051336—dated Mar. 4, 2020.
3GPP TSG-RAN WG1 NR#3; Prague, Czech; Source: Apple Inc.; Title: Slot Format Indicator in Group-common PDCCH (R1-1717782)—Oct. 9-13, 2017.
Summary of Notice of Preliminary Rejection issued for Korean Patent Application No. 2021-7025304—dated Dec. 9, 2022.
Russian Decision of Grant issued for Application No. 2021123157/07—dated Dec. 20, 2019.
Official Action issued for Chinese Application No. 201980088551.9 dated Sep. 28, 2023.

* cited by examiner

1310 Receiving, from at least one sending network node, a TDD configuration of the at least one sending network node identifying: at least one slot of the TDD configuration as either a fixed UL slot for which all symbols are for UL transmission or a fixed DL slot for which all symbols are for DL transmission; and at least one slot of the TDD configuration as a flexible slot for which at least one symbol has an undefined transmission direction and the remaining symbols of the slot, if any, have a defined transmission direction which is either UL or DL

1320 Adapting operations in a cell based on the received TDD configuration for mitigating CLI with the at least one sending network node

*FIG. 13a*

1330 Determining a TDD configuration of the sending network node identifying: at least one slot of the TDD configuration as either a fixed UL slot for which all symbols are for UL transmission or a fixed DL slot for which all symbols are for DL transmission; and at least one slot of the TDD configuration as a flexible slot for which at least one symbol has an undefined transmission direction and the remaining symbols of the slot, if any, have a defined transmission direction which is either UL or DL

1340 Sending the determined TDD configuration for enabling CLI mitigation

*FIG. 13b*

1802 Receive, from at least one other base station, information associated with identifying the at least one time resource of the other base station as a fixed time resource and/or a flexible time resource

1804 Based on the information received from the at least one other base station, schedule a transmission or channel to mitigate the CLI

*FIG. 13c*

INTER-NODE COORDINATION FOR CROSS-LINK INTERFERENCE MANAGEMENT

PRIORITY

This nonprofessional application is a U.S. National Stage Filing under 35 U.S.C. § 371 of International Patent Application Serial No. PCT/SE2019/051336 filed Dec. 20, 2019 and entitled "Inter-Node Coordination for Cross-Link Interference Management" which claims priority to U.S. Provisional Patent Application No. 62/791,070 filed Jan. 11, 2019 and U.S. Provisional Patent Application No. 62/806,222 filed Feb. 15, 2019 both of which are hereby incorporated by reference in their entirety.

TECHNICAL FIELD

The present invention generally relates to wireless communication networks, and particularly relates to cross-link interference (CLI) mitigation.

BACKGROUND

Interference Protection in Time Division Duplex (TDD) Networks

Wireless cellular networks are built up of cells, each cell defined by a certain coverage area of a network node (NN). The NN communicates with user equipment (UE) in the network wirelessly. The communication is carried out in either paired or unpaired spectrum. In case of paired spectrum, the downlink (DL) and uplink (UL) directions are separated in frequency, called Frequency Division Duplex (FDD). In case of unpaired spectrum, the DL and UL use the same spectrum, called TDD. As the name implies, the DL and UL are separated in the time domain, typically with a guard period (GP) between them. A GP serves several purposes. Most essentially, the processing circuitry at the NN and UE needs sufficient time to switch between transmission and reception. However this is typically a fast procedure and does not significantly contribute to the requirement of the GP size. There is one GP at a DL-to-UL switch and one GP at an UL-to-DL switch, but since the GP at the UL-to-DL switch only needs to give enough time to allow the NN and the UE to switch between reception and transmission, and consequently typically is small, it is for simplicity neglected in the following description. The GP at the DL-to-UL switch, however, must be sufficiently large to allow a UE to receive a possibly time-delayed DL grant scheduling the UL and transmit the UL signal with proper timing advance (compensating for the propagation delay) such that it is received in the UL part of the frame at the NN. In fact, the GP at the UL-to-DL switch is created with an offset to the timing advance. Thus, the GP should be larger than twice the propagation time towards a UE at the cell edge, otherwise, the UL and DL signals in the cell will interfere. Because of this, the GP is typically chosen to depend on the cell size such that larger cells (i.e. cells with large inter-site distances) have a larger GP than a small cell.

Additionally, the GP reduces DL-to-UL interference between NNs by allowing a certain propagation delay between cells without having the DL transmission of a first NN enter the UL reception of a second NN. In a typical macro network, the DL transmission power can be in the order of 20 dB larger than the UL transmission power, and the pathloss between NNs, that may be situated above roof top and in line of sight (LOS), may often be much smaller than the pathloss between NNs and UEs (in non-LOS). Hence, if the UL is interfered by the DL of other cells, so called CLI, the UL performance can be seriously degraded. Because of the large transmit power discrepancy between UL and DL and/or propagation conditions, CLI can be detrimental to system performance not only for the co-channel case where DL interferes UL on the same carrier, but also for the adjacent channel case where DL of one carrier interferes with UL on an adjacent carrier. Because of this, TDD macro networks are typically operated in a synchronized and aligned fashion where the symbol timing is aligned and a semi-static TDD UL/DL pattern is used which is the same for all the cells in the network; by aligning UL and DL periods so that they do not occur simultaneously the thinking is to reduce interference between UL and DL. Typically, operators with adjacent TDD carriers also synchronize their TDD UL/DL patterns to avoid adjacent CLI.

The principle of applying a GP at the DL-to-UL switch to avoid DL-to-UL interference between NNs is shown in FIG. 1 where a victim NN (V) is being (at least potentially) interfered by an aggressor NN (A). The aggressor NN A is sending a DL signal to a device in its cell, and the DL signal is also reaching the victim NN V as the propagation loss is not enough to protect it from the signals of aggressor NN A. Victim NN V is trying to receive a signal from another terminal (not shown in the figure) in its cell. The signal has propagated a distance (d) and due to propagation delay, the experienced frame structure alignment of A at V is shifted/delayed τ second, proportional to the propagation distance d. As can be seen from the figure, although the DL part of the aggressor NN A is delayed, it does not enter the UL region of the victim NN V due to the GP used. The system design serves its purpose. As a side note, the aggressor DL signal does of course undergo attenuation, but may due to differences in transmit powers in terminals and NNs as well as propagation condition differences for NN-to-NN links and UE-to-NN links be very high relative to the received victim UL signal.

It could be noted that the terminology victim and aggressor is only used here to illustrate why typical TDD systems are designed as they are. The victim can also act as an aggressor and vice versa and even simultaneously since channel reciprocity exists between the NN.

NR Frame Structure

The radio access technology (RAT) next generation mobile wireless communication system (5G) or new radio (NR), supports a diverse set of use cases and a diverse set of deployment scenarios. The later includes deployment at both low frequencies (100 s of MHz), similar to the RAT LTE today, and very high frequencies (mm waves in the tens of GHz).

Similar to LTE, NR uses Orthogonal Frequency Division Multiplexing (OFDM) in the DL (i.e. from an NN, gNB, eNB, or base station, to a user equipment or UE). The basic NR physical resource over an antenna port can thus be seen as a time-frequency grid as illustrated in FIG. 2, where a resource block (RB) in a 14-symbol slot is shown. A RB corresponds to 12 contiguous subcarriers in the frequency domain. Each resource element corresponds to one OFDM subcarrier during one OFDM symbol interval.

RB are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times 2^\alpha)$ kHz where $\alpha \in (0,1,2,3,4)$. $\Delta f=15$ kHz is the basic (or reference) subcarrier spacing that is also used in LTE.

In the time domain, DL and UL transmissions in NR will be organized into equally-sized subframes of 1 ms each, similar to LTE. A subframe is further divided into multiple slots of equal duration. The slot length for subcarrier spacing $\Delta f=(15\times 2^\alpha)$ kHz is $\frac{1}{2}^\alpha$ ms. There is only one slot per subframe at $\Delta f=15$ kHz and a slot consists of 14 OFDM symbols.

DL transmissions are dynamically scheduled, i.e., in each slot the gNB transmits DL control information (DCI) about which UE data is to be transmitted to and which RBs in the current DL slot the data is to be transmitted on. This control information is typically transmitted in the first one or two OFDM symbols in each slot in NR. The control information is carried on the Physical Downlink Control Channel (PDCCH) and data is carried on the Physical Downlink Shared Channel (PDSCH). A UE first detects and decodes PDCCH and if a PDCCH is decoded successfully, it then decodes the corresponding PDSCH based on the decoded control information in the PDCCH.

In addition to PDCCH and PDSCH, there are also other channels and reference signals (RSs) transmitted in the DL.

UL data transmissions, carried on Physical Uplink Shared Channel (PUSCH), are also dynamically scheduled by the gNB by transmitting a DCI. In case of TDD operation, the DCI (which is transmitted in the DL region) always indicates a scheduling offset so that the PUSCH is transmitted in a slot in the UL region.

Uplink-Downlink Configurations in TDD

In TDD, some subframes/slots are allocated for UL transmissions and some subframes/slots are allocated for DL transmissions. The switch between DL and UL occurs in the so called special subframes in LTE or flexible slots in NR.

LTE TDD Configuration

In 3GPP TS 36.211 V15.3.0, three radio frame structures are supported. Frame structure type 1 (FS 1) is applicable to FDD only, frame structure type 2 (FS 2) is applicable to TDD only, and frame structure type 3 (FS 3) is applicable to licensed assisted access (LAA) secondary cell operation only.

With FS 2 for TDD, each radio frame of length 10 ms consists of two half-frames of length 5 ms each. Each half-frame consists of five subframes (SFs) of length 1 ms. Each subframe (SF) is defined by two slots of length 0.5 ms each. Within each radio frame, a subset of SFs is reserved for UL transmissions, and the remaining SFs are allocated for DL transmissions, or for special SFs, where the switch between DL and UL occurs.

As shown in Table 1, seven different DL/UL configurations are supported for FS 2. Here, "D" denotes a DL SF, "U" denotes an UL SF, and "S" represents a special SF. Configurations 0, 1, 2, and 6 have 5 ms DL-to-UL switch-point periodicity, with the special SF exists in both SF 1 and SF 6. Configurations 3, 4 and 5 have 10 ms DL-to-UL switch-point periodicity, with the special SF in SF 1 only.

TABLE 1

LTE UL-DL configurations (from 36.211, Table 4.2-2)

| UL-DL configuration | DL-to-UL Switch-point periodicity | \multicolumn{10}{c}{Subframe number} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A special SF is split into three parts: a DL part (DwPTS), a GP, and an UL part (UpPTS). In 3GPP TS 36.211 V15.3.0, a set of DwPTS/GP/UpPTS configurations is supported, as illustrated in Table 2, where X denotes the number of symbols that can be additionally configured for Sounding Reference Signal (SRS) enhancement. The DwPTS with a duration more than 3 symbols can be treated as a normal DL SF for data transmission. However, the UpPTS is not used for data transmission due to its very short duration for special SF configurations 0-9. Instead, the UpPTS for these configurations can be used for channel sounding or random access. In LTE release 14, special SF configuration 10 was introduced for uplink coverage enhancement, and the UpPTS of this configuration can be used for uplink data transmission.

TABLE 2

Special SF configurations (lengths of DwPTS/GP/UpPTS in symbols)

| Special SF configuration | Normal CP for DL and UL | | | Extended CP for DL and UL | | |
|---|---|---|---|---|---|---|
| | DwPTS | GP | UpPTS | DwPTS | GP | UpPTS |
| 0 | 3 | 10 − X | 1 + X | 3 | 8 − X | 1 + X |
| 1 | 9 | 4 − X | 1 + X | 9 | 2 − X | 1 + X |
| 2 | 10 | 3 − X | 1 + X | 10 | 1 − X | 1 + X |
| 3 | 11 | 2 − X | 1 + X | 11 | 0 − X | 1 + X |
| 4 | 12 | 1 − X | 1 + X | 3 | 7 − X | 2 + X |
| 5 | 3 | 9 − X | 2 + X | 9 | 1 − X | 2 + X |
| 6 | 9 | 3 − X | 2 + X | 10 | 0 − X | 2 + X |
| 7 | 10 | 2 − X | 2 + X | 5 | 5 − X | 2 + X |
| 8 | 11 | 1 − X | 2 + X | | | |
| 9 | 6 | 6 − X | 2 + X | | | |
| 10 | 6 | 2 | 6 | | | |

Typically, the DL/UL configuration and the configuration of the special SF used in a cell are signaled as part of the system information, which is included in system-information block 1 (SIB1) and broadcasted every 80 ms within SF 5.

To better handle the high traffic dynamics in a local-area scenario, the enhanced Interference Mitigation and Traffic Adaptation (eIMTA) feature was introduced in LTE Rel-12 to allow for dynamic and flexible configuration of TDD UL/DL resources. More specifically, a UE can be configured by higher layers to monitor PDCCHs with cyclic redundancy check (CRC) scrambled by eIMTA-RNTI. By detecting the DCI carried on the PDCCHs (i.e., DCI format 1C), the UE knows the reconfigured TDD UL/DL configurations for one or more serving cell(s). The reconfigured TDD UL/DL configuration for each serving cell is selected from the seven configurations defined in Table 1 and signaled by the corresponding 3-bit UL/DL configuration index filed in the DCI. Table 3 illustrates the eIMTA based flexible TDD frame structure, where "F" denotes a flexible SF, which can be configured either to UL or DL, depending on which TDD UL/DL configuration is selected.

The TDD UL/DL reconfiguration can be operated on a radio frame basis, and the reconfiguration can be applied for a few radio frames configured by higher layer parameters.

TABLE 3 eIMTA based flexible TDD
Subframe number

| 0 | 1 | 2 | 3 | 4 | 5 | 6 | 7 | 8 | 9 |
|---|---|---|---|---|---|---|---|---|---|
| D | S | U | F | F | D | D or S | F | F | F |

NR TDD Configuration

Similar to LTE, NR supports semi-static TDD UL/DL configurations by cell-specific RRC (Radio Resource Control) signaling (TDD-UL-DL-ConfigurationCommon in SIB1). In contrast to LTE, up to two concatenated TDD DL-UL patterns can be configured in NR. Each TDD DL-UL pattern is defined by a number of consecutive full DL slots at the beginning of the TDD pattern (nrofDownlinkSlots), a number of consecutive DL symbols in the slot following the full DL slots (nrofDownlinkSymbols), a number of symbols between DL and UL segments (GP, or flexible symbols), a number of UL symbols in the end of the slot preceding the first full UL slot (nrofUplinkSymbols), and a number of consecutive full UL slots at the end of the TDD pattern (nrofUplinkSlots). The periodicity of a TDD DL-UL pattern (dl-UL-TransmissionPeriodicity) can be configured ranging from 0.5 ms to 10 ms.

Besides the cell-specific TDD UL/DL configuration via TDD-UL-DL-ConfigurationCommon, a UE can be additionally configured by a UE-specific RRC signaling (TDD-UL-DL-ConfigDedicated) to override only the flexible symbols provided in the cell-specific semi-static TDD configuration.

In addition, NR supports dynamic TDD, that is, dynamical signalling of the DL, flexible, and UL allocation on symbol level for one or multiple slots to a group of UEs by using a Slot Format Indicator (SFI) in the DCI carried on a group-common PDCCH (DCI Format 2_0). The SFI filed in a DCI format 2_0 indicates a slot format for each slot in a number of slots starting from a slot where the DCI format 2_0 is detected.

A slot format is identified by a corresponding format index as provided in Table 4, where 'D' denotes a downlink symbol, 'U' denotes an uplink symbol, and 'F' denotes a flexible symbol.

TABLE 4

Slot formats for normal cyclic prefix (from TS 38.213 V15.3.0 Table 11.1.1-1)

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |

TABLE 4-continued

Slot formats for normal cyclic prefix (from TS 38.213 V15.3.0 Table 11.1.1-1)

| Format | \multicolumn{14}{c}{Symbol number in a slot} |
|---|---|---|---|---|---|---|---|---|---|---|---|---|---|---|

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{c}{UE determines the slot format for the slot based on TDD-UL-DL-ConfigurationCommon, or TDD-UL-DL-ConfigDedicated and, if any, on detected DCI formats} |

The dynamic SFI cannot override the DL and UL transmission directions that are semi-statically configured via the cell-specific RRC signalling, neither can it override a dynamically scheduled DL or UL transmissions. However, the SFI can override a symbol period semi-statically indicated as flexible by restricting it to be DL or UL. In addition, the SFI can be used to provide a reserved resource, that is, if both the SFI and the semi-static signalling indicate a certain symbol to be flexible, then, the symbol should be treated as reserved and not be used for transmission.

The support for dynamic TDD enables NR to maximally utilize available radio resource in the most efficient way for both traffic directions. Although dynamic TDD brings significant performance gain at low to medium loads, the performance benefits become smaller as the traffic load increases due to the CLI. As shown in FIG. 3, if two cells have different traffic directions, UE1 in DL experiences very strong interference from UE2 which can be closer than the serving NN1. From NN2 in UL perspective, NN2 will also experience interference from NN1 since NN1 is transmitting in DL. CLI is the main impediment to performance gains from dynamic TDD operation at higher loads as compared to static TDD. Most solutions to minimize the CLI involve defining signaling between NNs in order to exchange information regarding the sources and the levels of interference in the operator network.

The situation can also be illustrated on symbol level where the different NNs use different transmission directions in different symbols, see FIG. 4, assuming that in a given slot, the format index 48 is configured for the UEs in NN1 and the format index 49 is configured for the UEs in NN2. The situation shown in FIG. 3 occurs in symbol index 2, 3, 9 and 10 of FIG. 4.

NR Physical Random Access Channel Design

Physical Random Access Channel (PRACH) is used to transmit a random-access preamble from a UE to indicate a random-access attempt to the gNB and to assist the gNB to adjust the uplink timing of the UE, among other parameters. Like in LTE, Zadoff-Chu sequences are used for generating NR random-access preambles due to their favourable properties, including constant amplitude before and after DFT operation, zero cyclic auto-correlation and low cross-correlation.

NR PRACH Formats

NR random-access preamble supports two different sequence lengths with different format configurations, as shown in FIG. 5, to handle the wide range of deployments for which NR is designed.

For the long sequence of length 839, four preamble formats that originated from the LTE preambles are supported, mainly targeting large cell deployment scenarios. These formats can only be used in FR1 and have a subcarrier spacing of 1.25 or 5 kHz.

For the short sequence of length 139, nine different preamble formats are introduced in NR, mainly targeting the small/normal cell and indoor deployment scenarios. The short preamble formats can be used in both FR1 with subcarrier spacing of 15 or 30 kHz and FR2 with subcarrier spacing of 60 or 120 kHz. The basic design principle for PRACH preamble is that the last part of each preamble OFDM symbol acts as a CP for the next OFDM symbol. In contrast to LTE, for the design of the short preamble formats, the length of a preamble OFDM symbol equals the length of data OFDM symbols. This new design allows the gNB receiver to use the same fast Fourier transform for data and random-access preamble detection. In addition, due to the composition of multiple shorter OFDM symbols per PRACH preamble, the new short preamble formats are more robust against time varying channels and frequency errors.

NR PRACH Configuration

In NR, the time and frequency resource on which a PRACH preamble is transmitted is defined as a PRACH occasion. The time resources and preamble format for PRACH transmission is configured by a PRACH configuration index, which indicates a row in a PRACH configuration table specified in TS 38.211 V15.2.0 Tables 6.3.3.2-2, 6.3.3.2-3, 6.3.3.2-4 for FR1 paired spectrum, FR1 unpaired spectrum and FR2 with unpaired spectrum.

Part of the Table 6.3.3.2-3 for FR1 unpaired spectrum for PRACH preamble format 0 is copied in TABLE 5 below, where the value of x indicates the PRACH configuration period in number of system frames. The value of y indicates the system frame within each PRACH configuration period on which the PRACH occasions are configured. For instance, if y is set to 0, then, it means PRACH occasions only configured in the first frame of each PRACH configuration period. The values in the column "subframe number" tells which subframes that are configured with PRACH occasion. The values in the column "starting symbol" are the symbol indices.

In case of TDD, semi-statically configured DL parts and/or actually transmitted SSBs can override and invalidate some time-domain PRACH occasions defined in the PRACH configuration table. More specifically, PRACH occasions in the UL part are always valid, and a PRACH occasion within the X part is valid as long as it does not precede or collide with an SSB in the RACH slot and it is at least N symbols after the DL part and the last symbol of an SSB. N is 0 or 2 depending on PRACH format and subcarrier spacing.

time-domain PRACH occasion, can be 1, 2, 4, or 8. FIG. 6 gives an example of the PRACH occasion configuration in NR.

CLI Measurements

To assist the operator in understanding the pathloss between NNs and UEs, CLI measurements can be adopted. These measurements can be based on for example the total received signal, e.g. RSSI (Received Signal Strength Indicator), or the received signal strength from a specific set of transmitting NN/UE, e.g. RSRP (Received Signal Reference Power).

Certain problems exist. For example, one solution to mitigate the CLI is to let different network nodes dynamically exchange their intended DL/UL transmission direction configurations via backhaul signaling. For instance, the intended DL/UL transmission direction configuration can include the parameters such as the periodicity, the numerology, the slot format for each slot within a period, etc. And this intended DL/UL Tx direction configuration is repeatedly applied till it is newly updated.

TABLE 5

PRACH configuration for preamble format 0 for FR1 unpaired spectrum

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | | | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

In the frequency domain, NR supports multiple frequency-multiplexed PRACH occasions on the same time-domain PRACH occasion. This is mainly motivated by the support of analog beam sweeping in NR such that the PRACH occasions associated to one SSB are configured at the same time instance but different locations. The number of PRACH occasions frequency division multiplexed in one This method may provide a network node with very detailed information on the intended dynamic TDD pattern to be used in the neighboring nodes. However, this solution requires significant amount of information exchange via backhaul, which may significantly increase the backhaul signaling load. Moreover, depending on the traffic situations in a network node, the network node may adapt its TDD configuration dynamically, where the updates also need to be communicated to other network nodes. This puts significant requirements on the backhaul latency as well. Hence, dynamic exchange of intended DL/UL transmission configurations among network nodes via backhaul signaling is not feasible nor reliable.

Furthermore, with excessive information exchange between nodes where there is no central decision process, the usefulness of the information can be questioned. As one example, it is not clear how each node should adopt to the information provided in for example the scheduling decision if it does not know how other nodes behave when receiving similar information.

SUMMARY

Certain aspects of the present disclosure and their embodiments may provide solutions to these or other challenges. For example, according to certain embodiments, for each NN or for each set of NNs, the time domain resources are classified as fixed time resources and flexible time resources. The information of the fixed/flexible resource classification is exchanged between different network nodes or different sets of network-nodes for assisting the CLI coordination and CLI mitigation.

According to a first aspect, a method performed by a receiving network node for cross-link interference, CLI, mitigation is provided. The method comprises receiving, from at least one sending network node, a time division duplex configuration of the at least one sending network node. The time division duplex configuration is identifying at least one slot of the time division duplex configuration as either a fixed uplink slot for which all symbols are for uplink transmission or a fixed downlink slot for which all symbols are for downlink transmission; and at least one slot of the time division duplex configuration as a flexible slot for which at least one symbol has an undefined transmission direction and the remaining symbols of the slot, if any, have a defined transmission direction which is either uplink or downlink. The method further comprises adapting operations in a cell based on the received time division duplex configuration for mitigating CLI with the at least one sending network node.

According to a second aspect, a method performed by a sending network node for cross-link interference, CLI, mitigation is provided. The method comprises determining a time division duplex configuration of the sending node. The time division duplex configuration identifies at least one slot of the time division duplex configuration as either a fixed uplink slot for which all symbols are for uplink transmission or a fixed downlink slot for which all symbols are for downlink transmission; and at least one slot of the time division duplex configuration as a flexible slot for which at least one symbol has an undefined transmission direction and the remaining symbols of the slot, if any, have a defined transmission direction which is either uplink or downlink transmission. The method further comprises sending, to at least one receiving network node, the determined time division duplex configuration, for enabling CLI mitigation by the at least one receiving network node.

According to further aspects, a receiving network node and a sending network node configured to perform the methods according to the first and second aspect described above are provided.

Certain embodiments may provide one or more of the following technical advantages. For example, one technical advantage may be that the backhaul signaling overhead can be significantly reduced as compared to the existing solution for CLI mitigation by dynamic exchange of intended TDD configurations.

Another technical advantage may be that certain embodiments enable a NN to know the fixed resources configured for neighboring network nodes. By utilizing this information, the NN can protect the important channels/signals by scheduling or configuring them on resources that are unaffected by CLI. This information can be also used to assist the network node to do more efficient interference measurement resource configurations.

Compared to a frequent dynamic signaling of a detailed TDD configuration, the receiving NN can consider the information on configuration used to be fixed for the "foreseeable future" and hence the decision on how to best utilize the radio resources can be taken by each NN individually and the need for any central decision node is removed.

Still another technical advantage may be that certain embodiments more proactively protect the PRACH by taking the SSB and PRACH configuration into account when classifying the time resources into fixed and flexible resources.

BRIEF DESCRIPTION OF THE DRAWINGS

FIGS. 13a-d are flowcharts schematically illustrating methods according to embodiments.

DETAILED DESCRIPTION

Generalizations

Figure 1:
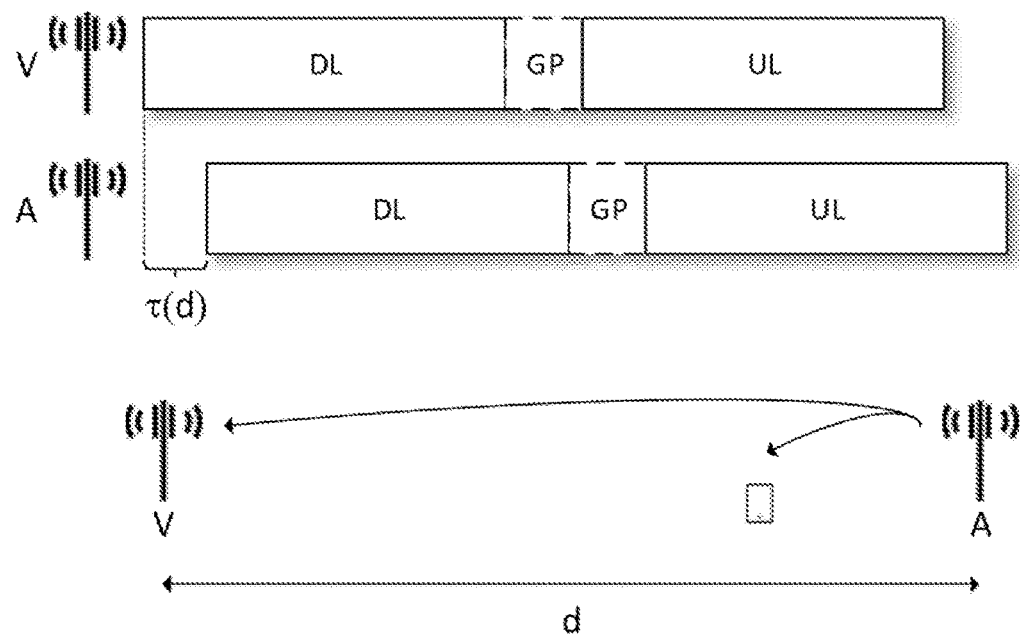
FIG. 1 is a schematic illustration of the principle of applying a GP for TDD to avoid DL-to-UL interference between NNs.
Figure 2:
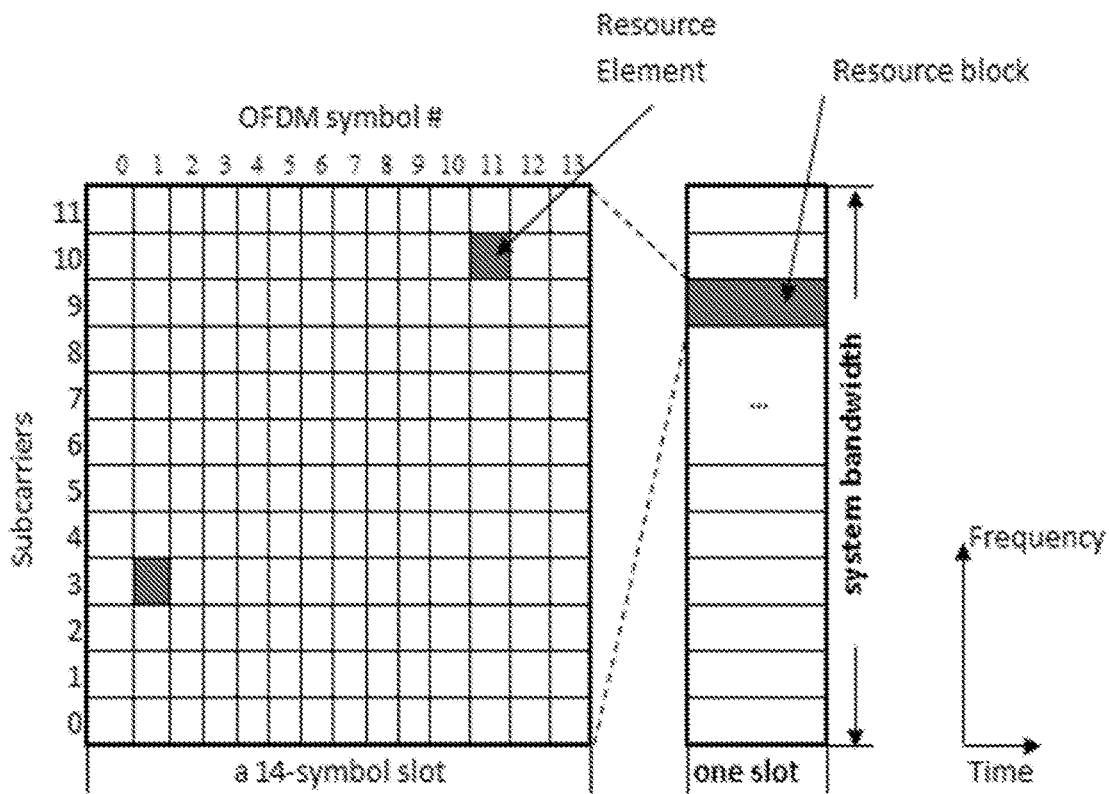
FIG. 2 is a schematic illustration of an NR physical resource grid.
Figure 3:
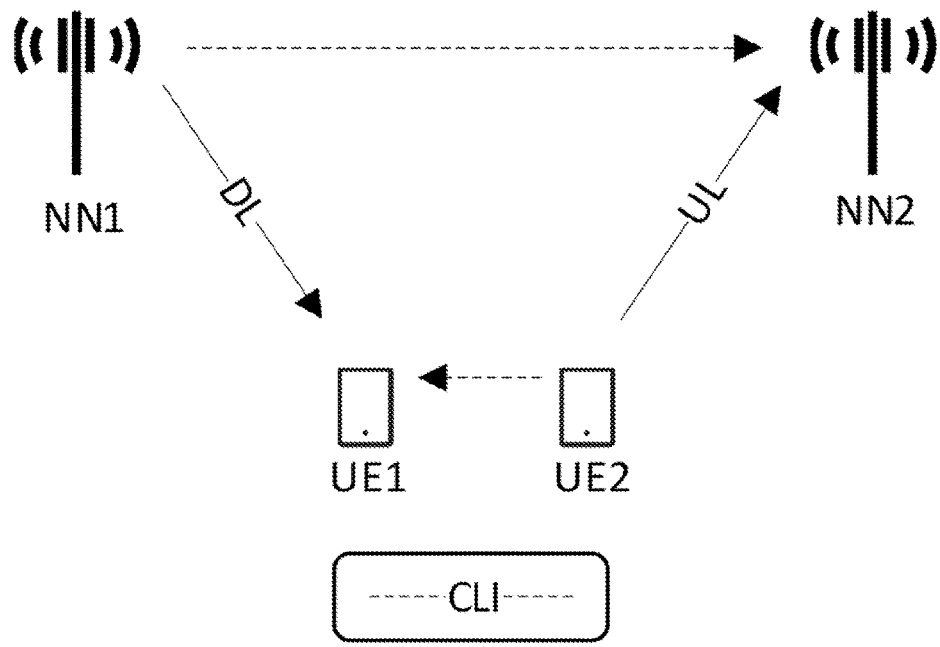
FIG. 3 is a schematic illustration of the CLI issue in dynamic TDD.
Figure 4:
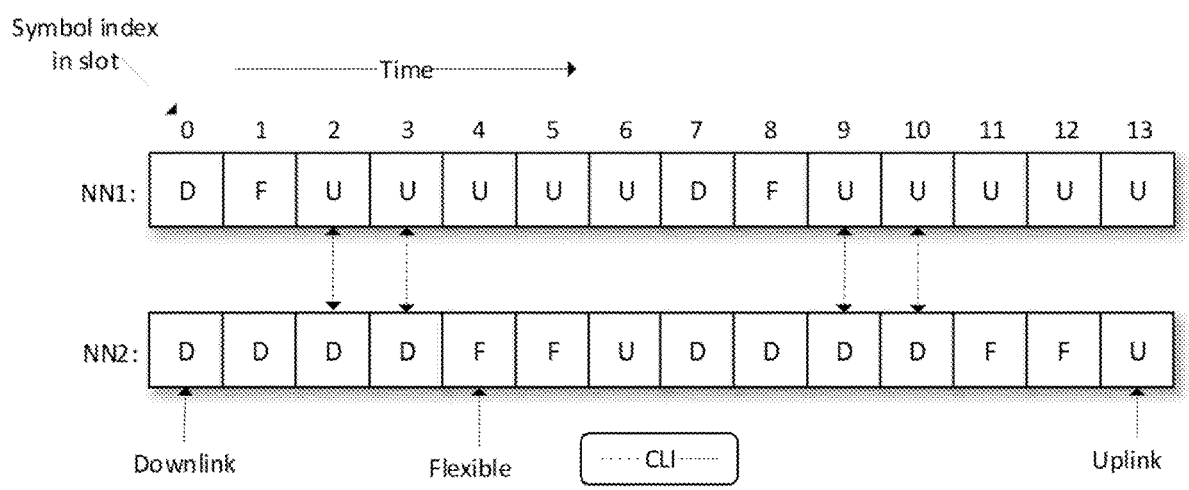
FIG. 4 is a schematic illustration of the CLI issue in an NR dynamic TDD in a given slot.
Figure 5:
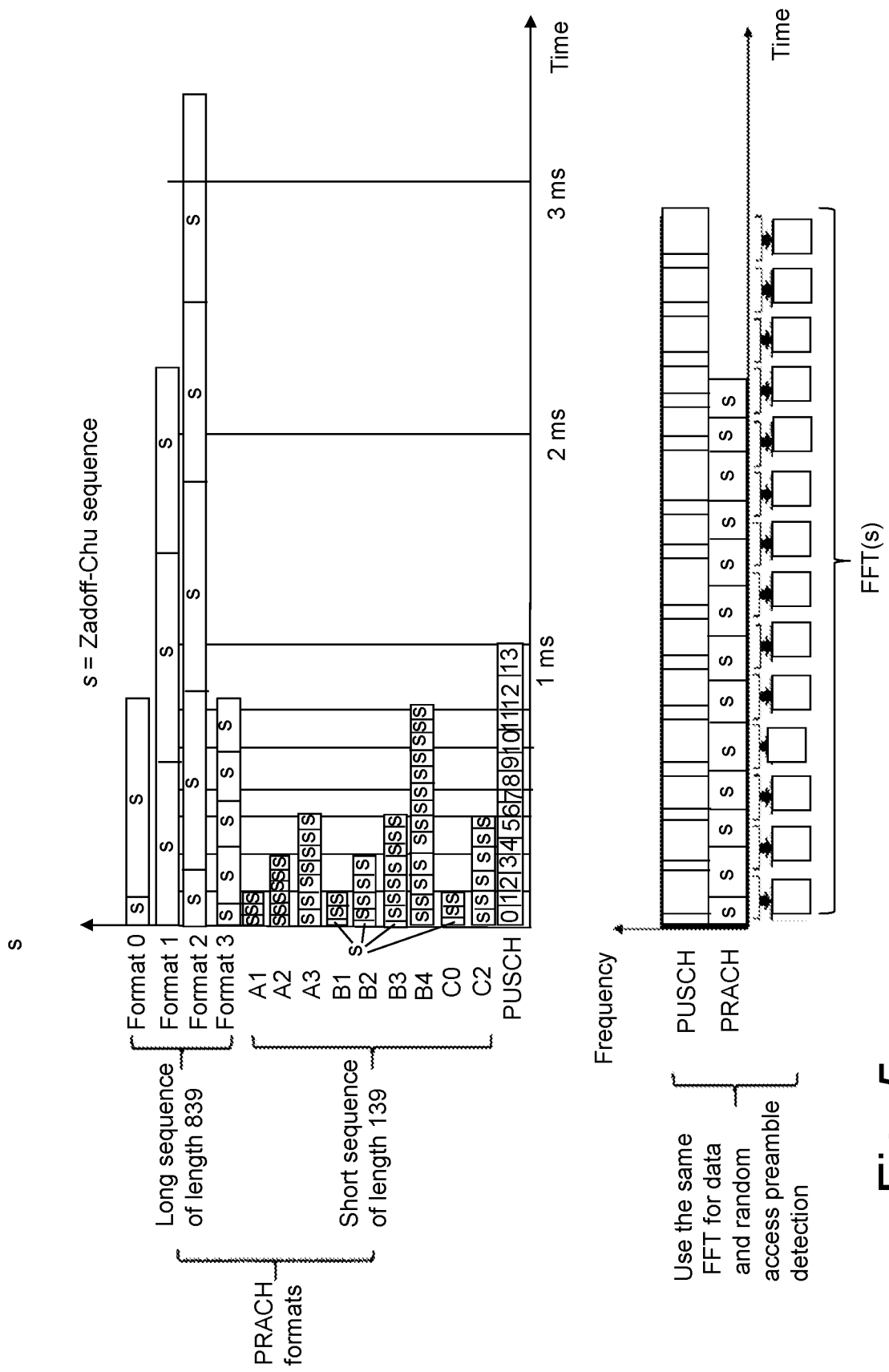
FIG. 5 is a schematic illustration of NR PRACH where 15 KHz subcarrier spacing is assumed for PRACH formats with short sequence length.
Figure 6:
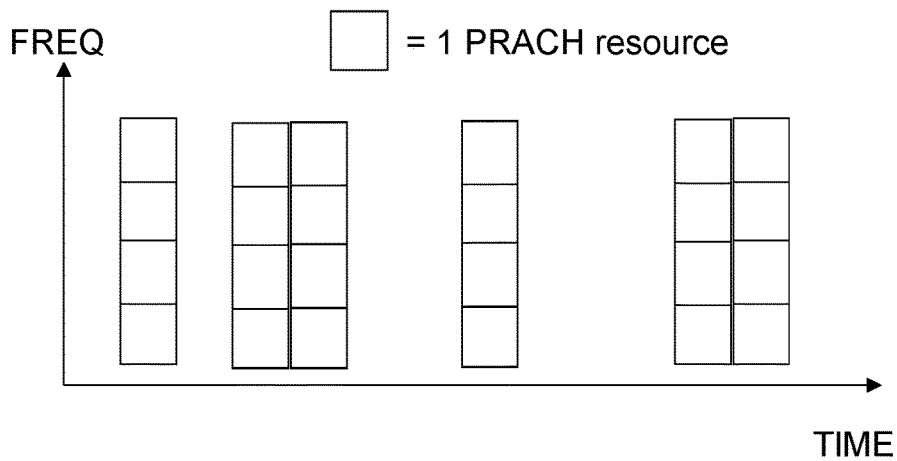
FIG. 6 is a schematic illustration of a PRACH configuration in NR.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

A network node (NN) can correspond to any type of radio network node or any network node, which communicates with a UE (directly or via another node) and/or with another network node. Examples of network nodes are NodeB, base station (BS), integrated access and backhaul (IAB) node, multi-standard radio (MSR) radio node such as MSR BS, eNodeB, gNodeB. MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC). Other examples of network nodes are NodeB, MeNB, eNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software). Furthermore, a NN can also correspond to a distributed gNB or BS, or to any one of the controlling unit and the distributed unit of a distributed BS.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE. A UE can be generalized to correspond to a user terminal, or a network node like a relay node or an IAB node.

An UL can be generalized to correspond to UL in the access link, and UL in the wireless backhaul link. Similarly, a DL can be generalized to correspond to DL in the access link, and DL in the wireless backhaul link.

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the network nodes herein may support a single or multiple RATs.

The term signal used herein can be any physical signal or physical channel. Examples of downlink physical signals are reference signals (RSs) such as PSS, SSS, CRS, PRS, CSI-RS, DMRS, NRS, NPSS, NSSS, SS, MBSFN RS etc. Examples of uplink physical signals are RSs such as SRS, DMRS etc. The term physical channel (e.g., in the context of channel reception) used herein is also called as 'channel. The physical channel carries higher layer information (e.g. RRC, logical control channel etc).

Additionally, terminologies such as base station/gNodeB and UE should be considered non-limiting and do not imply a certain hierarchical relation between the two.

Discussion Regarding Certain Aspects

Solutions for Network Coordination Mechanisms for CLI Handling

In theory, information exchange among different network nodes can provide a network node with additional knowledge on the CLI situation, and thereby making a better decision for CLI mitigation and increasing network performance. However, in practice, there are many challenges, e.g. backhaul signaling overhead, backhaul latency constraints, gNB/NN processing complexity, a lack of a centralized processing, etc., which make it difficult to achieve any performance gain via network coordination. The performance gains are even more difficult to realize in multi-vendor scenarios, where the timing and the latency of x2 message exchange can vary between different vendors, and the CLI mitigation schemes can be selected differently by different vendors.

Exchange of TDD Configurations for CLI Handling—NR TDD Configuration

NR supports semi-static TDD UL/DL configurations by cell-specific RRC signaling (TDD-UL-DL-Configuration-Common in SIB1). Up to two concatenated TDD DL-UL patterns can be configured in NR. Each TDD DL-UL pattern is defined by a number of consecutive full DL slots at the beginning of the TDD pattern (nrofDownlinkSlots), a number of consecutive DL symbols in the slot following the full DL slots (nrofDownlinkSymbols), a number of symbols between DL and UL segments (GP, or flexible symbols), a number of UL symbols in the end of the slot preceding the first full UL slot (nrofUplinkSymbols), and a number of consecutive full UL slots at the end of the TDD pattern (nrofUplinkSlots). The periodicity of a TDD DL-UL pattern (DL-UL-TransmissionPeriodicity) can be configured ranging from 0.5 ms to 10 ms.

Besides the cell-specific TDD UL/DL configuration via TDD-UL-DL-ConfigurationCommon, a UE can be additionally configured by UE-specific RRC signaling (TDD-UL-DL-ConfigDedicated) to override only the flexible symbols provided in the cell-specific semi-static TDD configuration.

In addition, NR supports dynamic TDD, that is, dynamical configuring of the DL, flexible, and UL symbols for one or multiple slots for a group of UEs. Dynamic TDD configuration is enabled by using a Slot Format Indicator (SFI) in the DCI carried on a group-common PDCCH (DCI Format 2_0). A slot format is identified by a corresponding format index. The dynamic SFI cannot override the DL and UL transmission directions that are semi-statically configured via the cell-specific RRC signalling, neither can it override a dynamically scheduled DL or UL transmissions. However, the SFI can override a symbol period semi-statically indicated as flexible by restricting it to be DL or UL. In addition, the SFI can be used to provide a reserved resource, that is, if both the SFI and the semi-static signalling indicate a certain symbol to be flexible, then, the symbol should be treated as reserved and not be used for transmission.

Dynamic Exchange of TDD Configuration

One solution to mitigate the CLI is to let different network nodes dynamically exchange their intended DL/UL transmission configurations via backhaul signaling. For instance, the intended DL/UL transmission direction configuration can include the parameters like the TDD periodicity, the numerology, the slot format for each slot within the period, etc. This method can provide a network node with very detailed information on the intended dynamic TDD pattern to be used in the neighbouring nodes. However, this solution requires significant amount of information exchange via backhaul, which may significantly increase the backhaul signaling load. Moreover, depending on the traffic situations in a network node, the network node may adapt its TDD configuration dynamically. This puts significant requirements on the backhaul latency as well. Hence, dynamic exchange of intended DL/UL transmission configurations among network nodes via backhaul signalling is not feasible nor reliable.

Furthermore, with no central decision point, the usefulness of massive information exchange between nodes can be questioned. That is, how should each node adopt to the information provided in for example the scheduling decision if it does not know how other nodes behave when receiving similar information.

Slow Exchange of Fixed/Flexible TDD Configuration

An alternative solution proposed herein is to divide the time resources of each network node into fixed and flexible resources and to let different network notes exchange their fixed/flexible resource configurations via backhaul signalling. The transmission directions on the fixed time resources may change over time but are not expected to change frequently. One example is to exchange the cell-specific TDD configuration among neighboring nodes. After receiving the configuration of time resources from multiple network nodes, a given network node can take the union of the provided configurations to understand if a given transmission direction is common to all network nodes considered, and hence can consider these set of resources as "protected from CLI". Other resource can conversely be potentially considered impacted by CLI. Compared to a frequent dynamic signalling of a detailed TDD configuration, this solution can significantly reduce the backhaul signalling overhead and the backhaul latency requirement. In addition, the receiving network node can consider the fixed resources for the "foreseeable future", hence, the decision on how to best utilize the radio resources can be taken by each network node individually without a need for any central decision node or joint scheduling. For instance, a network node may transmit important DL signals/channels, such as SSB and the PDCCH/PDSCH of URLLC traffic in the common fixed DL slots. And a network node may also configure the PRACH resources or other important UL traffic such as URLLC PUSCH in the common fixed UL slots. Furthermore, the fixed/flexible resource information exchange can be used to assist a network node to do more efficient interference measurement resource (IMR) configurations.

Inter-NN Exchange of Intended UL/DL Configuration

Hereinafter, inter-NN exchange (e.g. between gNBs) of intended UL/DL configuration is discussed, such as the detailed message format, interpretation of remaining resources, and SSB/RACH configuration related exchange. Further, different types of coordination message exchanges are discussed.

One solution proposed herein is to divide the time resources of each NN into fixed and flexible resources and let the network nodes exchange their fixed/flexible resource configurations via backhaul signaling. The transmission directions on the fixed time resources are expected to be static for some foreseeable amount of time (but may change slowly), while the flexible resources can potentially change transmission direction as often as each TTI. After receiving the configuration of time resources from neighboring NNs, a given NN can take the union of the provided configurations to understand if a given transmission direction is common to all NNs considered, and hence "protected" from CLI. The other resources can then be considered potentially impacted by CLI. In one example solution, slots 1-3 and 9-10 within each radio frame are indicated as fixed DL slots and fixed UL slots, respectively, while slots 4-8 are indicated as flexible.

If the interpretation is instead that resources not indicated as UL or DL shall be interpreted as unused resources, the consequence would be that much more frequent dynamic signaling of the intended TDD configuration for each TTI would be needed. In particular, the neighboring NNs would need to coordinate for each TTI their actual scheduling decisions. As the backhaul signaling is also associated with a delay (typically in the order of 5-15 ms for Xn interface), it is not clear how such short-term signaling can be useful to the receiver as it quickly becomes outdated. Conversely, interpreting the resources instead as flexible would significantly reduce the backhaul signaling overhead, as well as the backhaul latency requirement. The receiving NN can instead consider that the fixed/flexible resource indication is valid for the "foreseeable future", until it receives a new message.

The proposed type of more slow scale coordination can be useful even without a central decision node or applying joint scheduling, which is why it may be suitable for inter-vendor information exchange over Xn. Each NN can individually decide how to best utilize its available radio resources based on the information received from its neighbors. For instance, a NN may transmit important DL signals/channels, such as SSB and the PDCCH/PDSCH of URLLC traffic in the common fixed DL slots. ANN may also configure the PRACH resources or other important UL traffic such as URLLC PUSCH in the common fixed UL slots.

Any slot/symbol not designated DL or UL is thus interpreted as a flexible slot/symbol. The fixed/flexible resource information exchange can be also used to assist a NN to do more efficient interference measurement resource (IMR) configurations.

Detailed Message Format

Different alternatives for the detailed message format exchange has been discussed in prior art. The proposal herein is a simple message exchange format following the structure of the TDD-UL-DL-SlotConfig IE, where a DL-UL-TransmissionPeriodicity in ms is defined together with a referenceSubcarrierSpacing. Together, these two entities define the number of slots in the TDD periodicity. A list of TDD-UL-DL-SlotConfig can then be given, where each TDD-UL-DL-SlotConfig indicates whether a slot with a certain slotIndex in the TDD periodicity is explicitly configured as either consisting of "all downlink symbols", "all uplink symbols" or "a number of downlink symbols and a number of uplink symbols".

As discussed in the previous section, the slots/symbols which are not configured as UL or DL (i.e. that do not have a corresponding entry in the slotConfigList) are interpreted as flexible. In typical operation, the NN could indicate a DL-UL-TransmissionPeriodicity which corresponds to the concatenated TDD pattern periodicity P_1+P_2 (or only P_1 if non-concatenated TDD pattern is used). However, if the NN knows that it will in practice use a TDD pattern with larger periodicity (e.g. by configuring the TDD pattern in SIB1 as containing many flexible resources and then in its implementation overriding, by PDSCH/PUSCH scheduling, some of the flexible resource in, for instance, every other TDD pattern as varying between UL and DL, so that the effective TDD periodicity becomes larger), this can be indicated as well. That is, the intended TDD pattern exchanged over Xn may or may not correspond to any UE-common or UE-dedicated signalling.

An alternative way to construct the message format could be to signal the TDD patterns directly, in a format similar to TDD-UL-DL-ConfigCommon. However, this format is much less flexible and does not save that much data overhead compared to the proposed format. Since this message exchange happens infrequently over the wired Xn interface, the overhead associated with it is not an issue and instead the aim should be to maximize flexibility. Exchange of messages for intended UL-DL is thus proposed as in the Intended-TDD-UL-DL-Config IE from 3GPP TS 38.331 V15.3.0 as described above.

SSB/RACH Configuration

Another issue that has been discussed is whether it is sufficient to exchange intended TDD pattern, or if additional configurations of SSB resources and/or PRACH resources needs to be exchanged as well. The motivation would be that an SSB or PRACH resource configured to a UE can override resources configured as flexible by the common or dedicated TDD configuration, and these resources may be transmitted with a longer periodicity than the TDD pattern periodicity.

In the proposal given in the previous section, the NN could indicate intended UL/DL configuration for a longer effective TDD periodicity than it is possible to configure to a UE and hence it could include the effect of such SSB/PRACH resources. Inter-NN message exchange of fixed/flexible UL/DL resources can use a longer periodicity than that which can be signaled as TDD periodicity in SIB1, and can hence capture that configured SSB/PRACH resources create a larger effective TDD periodicity compared to the TDD periodicity configured in SIB1. The exchange of SSB position and periodicity between neighboring NNs is already possible, according to the current XnAP specification. Thus, no new signalling needs to be introduced. No additional exchange of SSB resources over Xn needs to be introduced for CLI coordination purpose. Regarding the PRACH occasions, it has been already agreed in NR Rel-15 that PRACH occasions in the UL part are always valid, and a PRACH occasion present in symbols configured as flexible is valid as long as it does not precede or collide with an SSB in the RACH slot and it is at least N symbols after the DL part and the last symbol of an SSB. N is 0 or 2, depending on PRACH format and subcarrier spacing.

Since the NN already has 'fixed UL' slots information based on the exchange as suggested above, a NN can schedule PRACH occasions such that they fall into these 'fixed UL' slots. Therefore, there is no need to have PRACH configuration exchange. The current XnAP specification along with the proposed intended DL/UL configuration exchange is sufficient for NN coordination and there is no need of SSB/RACH configuration information exchange.

Embodiments

Some of the embodiments herein will now be described more fully with reference to the accompanying drawings.

According to certain embodiments, a solution is provided that includes classifying the time resources of a NN or a set of NNs into two types: fixed time resources and flexible time resources. Then, this fixed/flexible resource classification is exchanged between different NNs or different sets of NNs for CLI mitigation by partially coordinated transmission.

A fixed time resource implies that the time resources may change over time but are not expected to change frequently. The fixed time resources include the fixed UL resources that can only be used for UL transmissions/receptions, the fixed DL resources that can only be used for DL transmissions/receptions, and possibly the reserved resources not to be used for communication. The fixed and flexible resource classification can be done on different granularities, e.g., a slot level or a symbol level, and can be indicated in different ways via the backhaul, e.g., the exact TDD config, or as delta info relative to a common reference TDD config.

After receiving the configuration of time resources from multiple NNs, a given NN can take the union of the provided configurations to understand if a given transmission direction is common to all NNs considered, and hence can consider these sets of resources as protected from CLI. Other resources can conversely be considered potentially impacted by CLI.

According to certain embodiments, additional details are disclosed relating to the exchange of information of fixed and flexible resources.

For example, according to a particular embodiment, the exchanged information may consist of two parts that can be exchanged in different time scales. The first part carries the cell-specific TDD configuration and a network node only signals this first part information to other network nodes when the cell-specific TDD configuration is updated in SIB1. The second part carries the network node's intention on the long-term usage of the flexible resourced configured in SIB1, i.e., the intended or planned fixed and flexible resources classification within the SIB1-configured flexible resources. The second part of the information can be exchanged more often than the first part of the information, e.g., based on long-term traffic situation changes in the network.

As another example embodiment, the exchanged information may cover both the cell-specific TDD configuration and the intended usage of the SIB1-configured flexible resources for DL/UL transmissions.

As still another example, certain embodiments disclosed herein add conditions on fixed and flexible resource classification, by taking SSB and PRACH configurations into account.

In the following, some examples are given on different methods for the fixed and flexible resource classification and methods for signaling the classification info via backhaul.

In some embodiments, the coordination messages are transmitted over the Xn interface between neighboring NNs.

According to certain embodiments, where inter-node coordination involves distributed NNs, the coordination messages are transmitted over the F1 interface within the involved NNs. In other embodiments, proprietary backhaul signaling is used. In yet other embodiments, the backhaul signaling is routed via the core network.

Fixed and Flexible Resource Classification and Backhaul Signaling a) Network Nodes With Different Semi-Static TDD Configurations

Figure 7:
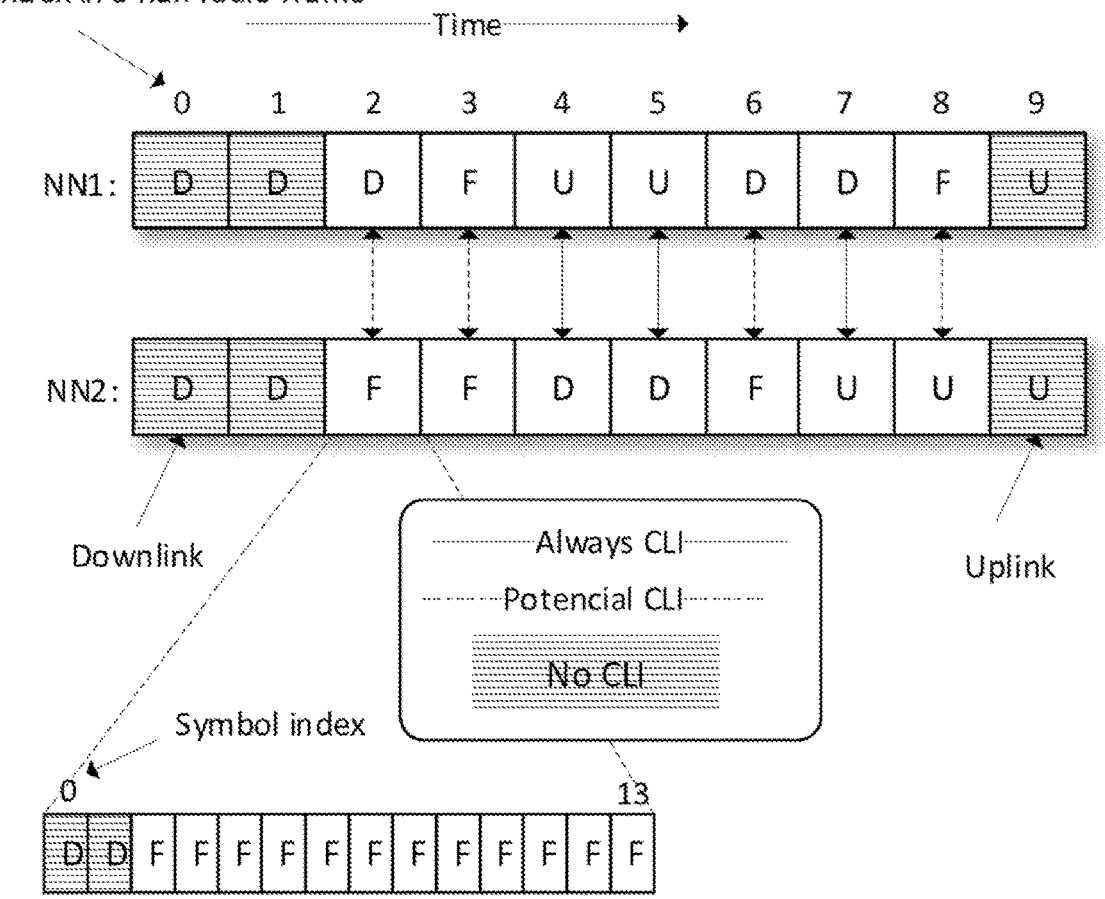
FIG. 7 is a schematic illustration of an example of two network nodes with different TDD semi-static UL-DL configurations.

As an example, two NNs are considered with different semi-static TDD UL-DL configurations: the cell-specific semi-static TDD configuration for NN1 is formed by a concatenation of two TDD patterns, DDDFUU and DDFU; and the cell-specific semi-static TDD configuration for NN2 is formed by a concatenation of another two TDD patterns, DDFF and DDFUUU, as shown in FIG. 7. This can be the case for the access links when the NNs belong to different operators with only semi-synchronized TDD configurations. it can also be the case for the wireless backhaul links when the IAB nodes are associated to un-synced parent nodes.

In FIG. 7, 'D' denotes a downlink slot where all symbols have DL Tx direction, 'U' denotes an uplink slot where all symbols have UL Tx direction, 'F' denotes a flexible slot where some or all symbols can have flexible Tx directions.

The TDD configurations shown in FIG. 7 can be achieved by, e.g., configuring the TDD-UL-DL-ConfigurationCommon field for NN1 as:
referenceSubcarrierSpacing=30 KHz
Pattern1 DDDFUU:
 dl-UL-TransmissionPeriodicity=3 ms
 nrofDownlinkSlots=3
 nrofDownlinkSymbols=0
 nrofUplinkSlots=2
 nrofUplinkSymbols=0
Pattern2 DDFU:
 dl-UL-TransmissionPeriodicity=2 ms
 nrofDownlinkSlots=2
 nrofDownlinkSymbols=0
 nrofUplinkSlots=1
 nrofUplinkSymbols=0
and configuring the TDD-UL-DL-ConfigurationCommon field for NN2 as:
referenceSubcarrierSpacing=30 KHz
Pattern1 DDFF:
 dl-UL-TransmissionPeriodicity=2 ms
 nrofDownlinkSlots=2
 nrofDownlinkSymbols=2
 nrofUplinkSlots=0
 nrofUplinkSymbols=0
Pattern2 DDFUUU:
 dl-UL-TransmissionPeriodicity=3 ms
 nrofDownlinkSlots=2
 nrofDownlinkSymbols=2
 nrofUplinkSlots=3
 nrofUplinkSymbols=0

As already mentioned above, the fixed and flexible resource classification can be done with different granularities, i.e. either with a slot level granularity or with a symbol level granularity, or with a mix of the two as described below.

When the fixed and flexible resource classification is on a symbol level, and based on the above assumption for the case shown in FIG. 7, the resources for NN1 can be classified as
 fixed resources: all symbols in slots {0, 1, 2, 4, 5, 6, 7, 9}
 flexible resources: all symbols in slots {3, 8}
and the resources for NN2 can be classified as
 fixed resources: all symbols in slots {0, 1, 4, 5, 7, 8, 9} and the first two symbols in slots {2 and 6}
 flexible resources: the last 12 symbols in slots {2, 6} and all symbols in slot 3

When the fixed and flexible resource classification is on a slot level, some information may be lost as compared to the classification on a symbol level. For example, the symbols in a flexible slot that actually have a fixed Tx direction will still be considered as flexible resources with the classification on a slot level. However, in many cases, the slot-level based classification can be enough for protecting important channels or signals and for assisting the network node to configure proper interference measurement resources.

As an example, a modified TDD-UL-DL-Configuration-Common field, can be exchanged among different network nodes or different sets of network nodes via backhaul to indicate the fixed and flexible resource classification. In the example of a slot level classification, the modification could consist in removing the parameters nrofDownlinkSymbols and nrofUplinkSymbols, In one embodiment, the network can change between resource classification on a symbol level and slot level to provide greater flexibility in the scheduling, while retaining the possibility to reduce overhead by switching to slot level classification.

b) Network Nodes With the Same Semi-Static TDD Configurations

If all the neighboring NNs belong to the same operator, it is highly likely that all these NNs are configured with the same cell-specific semi-static TDD configurations. Even for NNs belonging to different operators, this may still be the case due to regulations.

Figure 8:
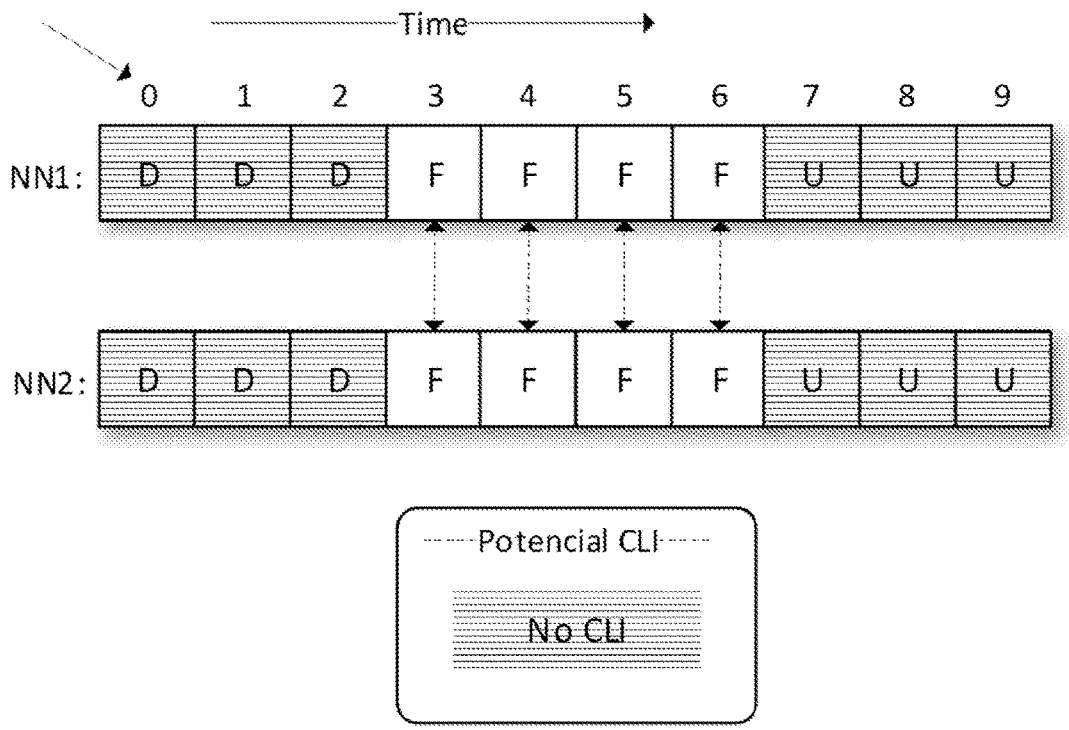
FIG. 8 is a schematic illustration of an example of two network nodes with the same cell-specific semi-static TDD UL-DL configurations.

FIG. 8 shows an example where two NNs, NN1 and NN2, are configured with the same TDD semi-static UL-DL configuration with the pattern DDDFFFFUUU.

If neighboring NNs always are configured with the same semi-static TDD pattern, there is no need to exchange the already known fixed TDD pattern between the NNs. However, since NR supports the use of DCI signaling and user-specific RRC signaling to override the flexible symbols provided in the cell-specific semi-static TDD configuration, it is still possible for a NN to configure part of these flexible resources as fixed resources to, e.g., adapt to its long-term traffic situation. In this case, each NN can classify the flexible resources indicated by the cell-specific semi-static TDD configuration further into fixed resources and flexible resources, and then, exchange this classification information among different network nodes via backhaul signaling.

Figure 9:
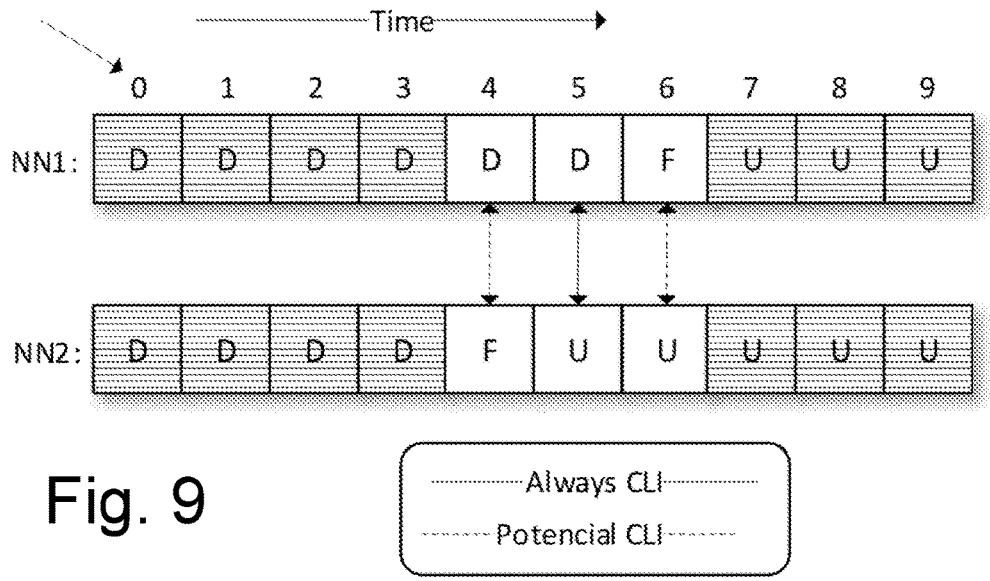
FIG. 9 is a schematic illustration of an example of two network nodes with the same cell-specific semi-static TDD UL-DL configurations as shown in FIG. 8 where some of the flexible slots are restricted to be DL or UL.

FIG. 9 shows an example where the flexible slots configured for NN1, slots 3, 4 and 5, are restricted to be DL slots, and for NN2, slot 3 is restricted to be DL slot, and slots 5 and 6 are restricted to be UL slots.

In this example, the cell-specific RRC indicated flexible resources for NN1 can be classified as fixed resources: slots {3,4,5}
flexible resources: slots {6} and the cell-specific RRC indicated flexible resources for NN2 can be classified as fixed resources: slots {3,5,6}
flexible resources: slots {4}

In an embodiment, the fixed and flexible resource classification can be exchanged via backhaul based on a reference semi-static TDD configuration, e.g., the common TDD configuration used for all network nodes.

As an example, the TDD-UL-DL-ConfigDedicated field (see TDD-UL-DL-Config information element from 3GPP TS 38.331 V15.3.0 below) can be used to indicate the fixed and flexible resource classification.

For instance, the slot-level resource classification indication for NN1 can be:

nrofDownlinkSlots=3
nrofUplinkSlots=0 and the slot-level resource classification indication for NN2 can be:

nrofDownlinkSlots=1
nrofUplinkSlots=2

Use of Resource Classification Information for CLI Mitigation or Coordination

The proposed solution herein enables a NN to know the fixed resource configured for neighboring NNs. By utilizing this information, the NN can protect the important channels/signals by scheduling or configuring them to the resources

| 3GPP TS 38.331 V15.3.0: TDD-UL-DL-Config information element |
| --- |

```
-- ASN1START
-- TAG-TDD-UL-DL-CONFIG-START
TDD-UL-DL-ConfigCommon ::=              SEQUENCE {
    referenceSubcarrierSpacing              SubcarrierSpacing,
    pattern1                                TDD-UL-DL-Pattern,
    pattern2                                TDD-UL-DL-Pattern
OPTIONAL, -- Need R
    ...
}
TDD-UL-DL-Pattern ::=                   SEQUENCE {
    dl-UL-TransmissionPeriodicity           ENUMERATED {ms0p5, ms0p625, ms1, ms1p25,
ms2, ms2p5, ms5, ms10},
    nrofDownlinkSlots                       INTEGER (0..maxNrofSlots),
    nrofDownlinkSymbols                     INTEGER (0..maxNrofSymbols-1),
    nrofUplinkSlots                         INTEGER (0..maxNrofSlots),
    nrofUplinkSymbols                       INTEGER (0..maxNrofSymbols-1),
    ...,
    [[
    dl-UL-TransmissionPeriodicity-v1530                 ENUMERATED {ms3, ms4}
OPTIONAL -- Need R
    ]]
}
TDD-UL-DL-ConfigDedicated ::=           SEQUENCE {
    slotSpecificConfigurationsToAddModList          SEQUENCE (SIZE (1..maxNrofSlots))
OF TDD-UL-DL-SlotConfig                 OPTIONAL, -- Need N
    slotSpecificConfigurationsToreleaseList         SEQUENCE (SIZE (1..maxNrofSlots))
OF TDD-UL-DL-SlotIndex                  OPTIONAL,-- Need N
    ...
}
TDD-UL-DL-SlotConfig ::=                SEQUENCE {
    slotIndex                               TDD-UL-DL-SlotIndex,
    symbols                                 CHOICE {
        allDownlink                             NULL,
        allUplink                               NULL,
        explicit                                SEQUENCE {
            nrofDownlinkSymbols                     INTEGER (1..maxNrofSymbols-1)
OPTIONAL,   -- Need S
            nrofUplinkSymbols                       INTEGER (1..maxNrofSymbols-1)
OPTIONAL    -- Need S
        }
    }
}
TDD-UL-DL-SlotIndex ::=                 INTEGER (0..maxNrofSlots-1)
-- TAG-TDD-UL-DL-CONFIG-STOP
-- ASN1STOP
```

Figure 10:
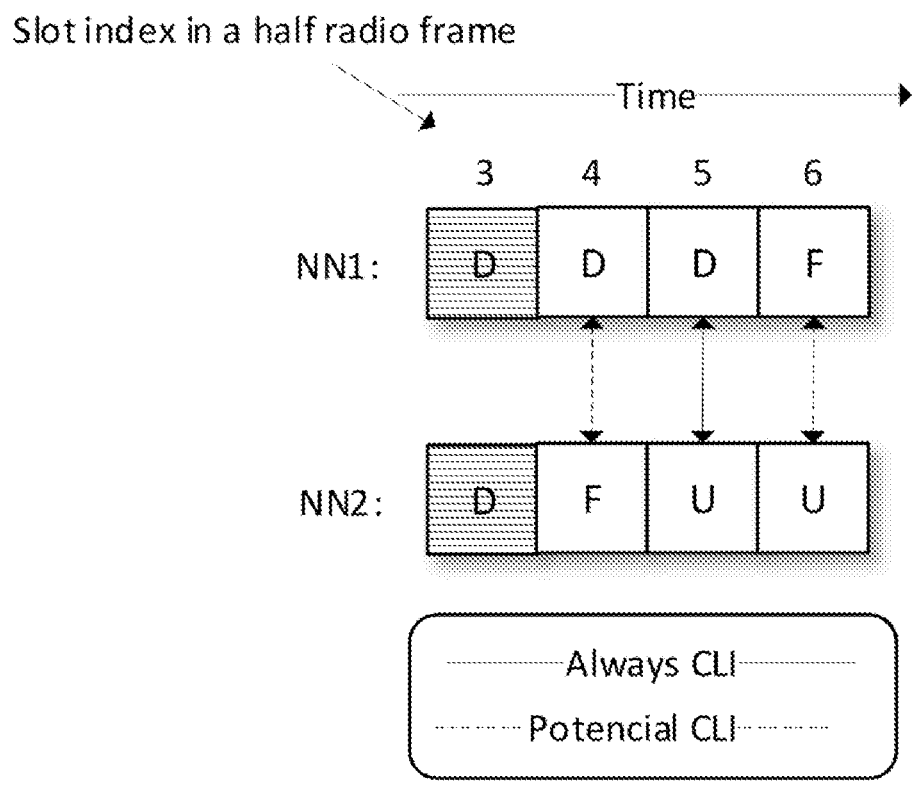
FIG. 10 is a schematic illustration of an example of extracted flexible slots indicated by the cell-specific semi-static TDD UL-DL configurations as shown in FIG. 8, and some of the flexible slots are restricted to be DL or UL.

As another example shown in FIG. 10, only the cell-specific RRC indicated flexible slots are extracted from the semi-static TDD configuration. Then, the TDD-UL-DL-ConfigurationCommon field or a modified TDD-UL-DL-ConfigurationCommon field can be used to indicate the fixed and flexible resource classification. This is similar to the methods discussed in bullet a) Network nodes with different semi-static TDD configurations above.

that will not be affected by CLI. For instance, consider the case shown in FIG. 7, the network may transmit important DL signals/channels, such as SSB (Synchronization Signal Block), the PDCCH/PDSCH of URLLC (Ultra Reliable Low Latency Communication) traffic, in slots 0 and 1. The network may also configure the PRACH resources or other important UL traffic such as URLLC PUSCH in slot 9.

The information of the fixed and flexible resource classification may also be used to assist the NN to understand more about the CLI situation. For instance, the information may enable the NN to configure different interference measurement resources in different slots which exhibit characteristic CLI situations. For instance, considering the case shown in FIG. 7, NN1 knows that there is always CLI from NN2 on slots 4, 5 and 7; there can be potential CLI from NN2 on slots 2, 3 and 6; and there will be CLI from NN2 if NN1 schedules downlink transmissions on slot 8. Therefore, for NN1, the UE-to-UE CLI measurements on slot 7 can be used as a reference. By comparing the UE-to-UE CLI measurements on slots 2, 3 or 6 with the reference, NN1 can better estimate the CLI level on these potential CLI slots. Furthermore, measurements can also be performed on slots {0,1,9} which would provide a CLI-free reference where normal DL interference levels would be reflected.

The NN may also utilize the aggregate information received from multiple neighboring nodes. For instance, important signals/channels may be scheduled in slots which only experience CLI from a subset of the neighboring cells, while slots that experience CLI from many neighboring cells are not used for this purpose.

Thus, according to certain embodiments described above, an inter-node condition method is proposed, where the time domain resources are classified as fixed and flexible resources, and only the information of the fixed/flexible resources is exchanged between different network nodes.

Certain further described embodiments provide detailed ways and message formats for exchanging the information relating to fixed/flexible resources. For example, according to a particular embodiment, the exchanged information may consist of two parts that can be exchanged in different time scales. Specifically, a first part may carry the cell-specific TDD configuration. In a particular embodiment, a network node only signals this first part of the information to other network nodes when the cell-specific TDD configuration is updated in SIB1. The second part carries the network node's intention on the long-term usage of the flexible resourced configured in SIB1, i.e., the intended/planned fixed and flexible resources classification within the SIB1-configured flexible resources. The second part of the information can be exchanged more often than the first part of the information, e.g., based on long-term traffic situation changes in the network.

An example of the message format to support the two-part transmission of information is shown above (TDD-UL-DL-Config information element (IE) from 3GPP TS 38.331 V15.3.0), where for instance structure similar to TDD-UL-DL-ConfigCommon conveys the first part and gives cell-specific TDD configuration and a structure similar to TDD-UL-DL-ConfigDedicated can be used to convey second part of the message, the long-term usage of flexible resources.

According to another embodiment, a single transmission of the exchanged information covers both the cell-specific TDD configuration and the intended usage of the SIB1-configured flexible resources for DL/UL transmissions.

An example of the message format to support the single transmission of the exchanged information is given according to the following. Unlike the TDD-UL-DL-ConfigCommon IE, which has two patterns defined, the proposed message format does not differentiate explicitly if there is one TDD pattern or a concatenation of two TDD patterns as this differentiation is implicit within DL-UL transmission periodicity. In this proposed message format, symbols within each slot defined by slotConfigList can be either all DL, all UL, or a combination with some flexible symbols.

Proposed message format for sending TDD configuration identifying fixed/flexible UL/DL
slots/symbols according to embodiments: Intended-TDD-UL-DL-Config information element

```
Intended-TDD-UL-DL-Config ::=              SEQUENCE {
    referenceSubcarrierSpacing                 SubcarrierSpacing,
    dl-UL-TransmissionPeriodicity              ENUMERATED {ms0p5, ms0p625, ms1, ms1p25,
ms2, ms2p5, ms3, ms4, ms5, ms10, ms20, ms40, ms60, ms80, ms100, ms120, ms140,
ms160} ,
    slotConfigList                             SEQUENCE (SIZE (0..maxNrofSlots)) OF TDD-
UL-DL-SlotConfig
}
TDD-UL-DL-SlotConfig ::=                   SEQUENCE {
    slotIndex                                  TDD-UL-DL-SlotIndex,
    symbols                                    CHOICE {
        allDownlink                                NULL,
        allUplink                                  NULL,
        explicit                                   SEQUENCE {
            nrofDownlinkSymbols                        INTEGER (1..maxNrofSymbols-
1)                                             OPTIONAL, -- Need S
            nrofUplinkSymbols                          INTEGER (1..maxNrofSymbols-
1)                                             OPTIONAL -- Need S
        }
    }
}
```

In a particular embodiment, this Intended-TDD-UL-DL-Config IE is the message exchanged between network nodes. This can also be applied to the case of network nodes with same semi-static TDD configurations as will be described in detail next, where only the slots with flexible symbols will be exchanged through this message exchange.

In some embodiments, the message sent between network nodes for coordination uses a message format comprising two messages, where a first message has a similar structure to TDD-UL-DL-ConfigCommon and a second message has a similar structure to TDD-UL-DL-ConfigDedicated in the TDD-UL-DL-Config IE (in 3GPP TS 38.331) copied above. That is, the first message defines one or more concatenated TDD UL-DL pattern structures by specifying—for each TDD DL-UL—a number of consecutive full DL slots at the beginning of the TDD pattern (nrofDownlinkSlots), a number of consecutive DL symbols in the slot following the full DL slots (nrofDownlinkSymbols), a number of UL symbols in the end of the slot preceding the first full UL slot (nrofUplinkSymbols), and a number of consecutive full UL slots at the end of the TDD pattern (nrofUplinkSlots). The remaining symbols or slots are being interpreted as flexible symbols or slots. Then, the second message defines an override of the flexible symbols or slots, for instance comprising a list of slots as in TDD-UL-DL-SlotConfig defined above in the proposed Intended-TDD-UL-DL-Config IE.

A motivation for using such a two-step message format is to reduce the overhead required for conveying the message information.

In some embodiments, the TDD configuration is represented in the form of a bitmap. In other embodiments, the TDD configuration is indicated by means of an analytical description.

Additionally, or alternatively, added conditions may be placed on fixed or flexible resource classification, by taking SSB and PRACH configurations into account.

In NR rel-15, it is possible for a network node to configure SSB transmissions on the flexible time resources indicated by SIB1, and it is also possible for a network node to configure PRACH occasions in the flexible time resources configured by SIB1, and these PRACH occasions are valid if certain conditions are met. More specifically, a PRACH occasion within the SIB1-configured flexible time resource part is valid as long as it does not precede or collide with an SSB in the RACH slot and it is at least N symbols after the DL part and the last symbol of an SSB. N is 0 or 2 depending on PRACH format and subcarrier spacing.

In an embodiment, for a network node, the network nodes consider its SSB and PRACH configurations and not only its TDD pattern configuration when determining the fixed/flexible resource indication message.

For example, to proactively protect its SSB transmissions, a network node may indicate that those SIB1-configured flexible symbols/slots which comprises SSB transmission (if such symbols/slots exist) are part of the fixed DL resources in the message signaled to other network nodes. Similarly, to proactively protect its PRACH transmissions, a network node may indicate that those SIB1-configured flexible symbols/slots that are valid for PRACH transmissions (if such symbols/slots exist) are part of the fixed UL resources in the message signaled to other network nodes.

As another example, some extra parameters are added in the backhaul signaling to indicate the fixed DL resources for SSB transmission in the SIB1-indicated flexible resource, and the fixed UL resources for PRACH transmission in the SIB1-indicated flexible resource. The parameters can include, e.g., the PRACH configuration index in the SIB1.

According to certain embodiments, in addition to the TDD configuration, the coordination messages may contain position information associated with a UE or a group of UEs.

According to certain embodiments, a NN uses its knowledge about the geographical position of its neighbor nodes and the knowledge about the relative position of a group of its connected UEs, to assemble a TDD-UL-DL-ConfigDedicated for that group of its connected UEs.

Figure 11:
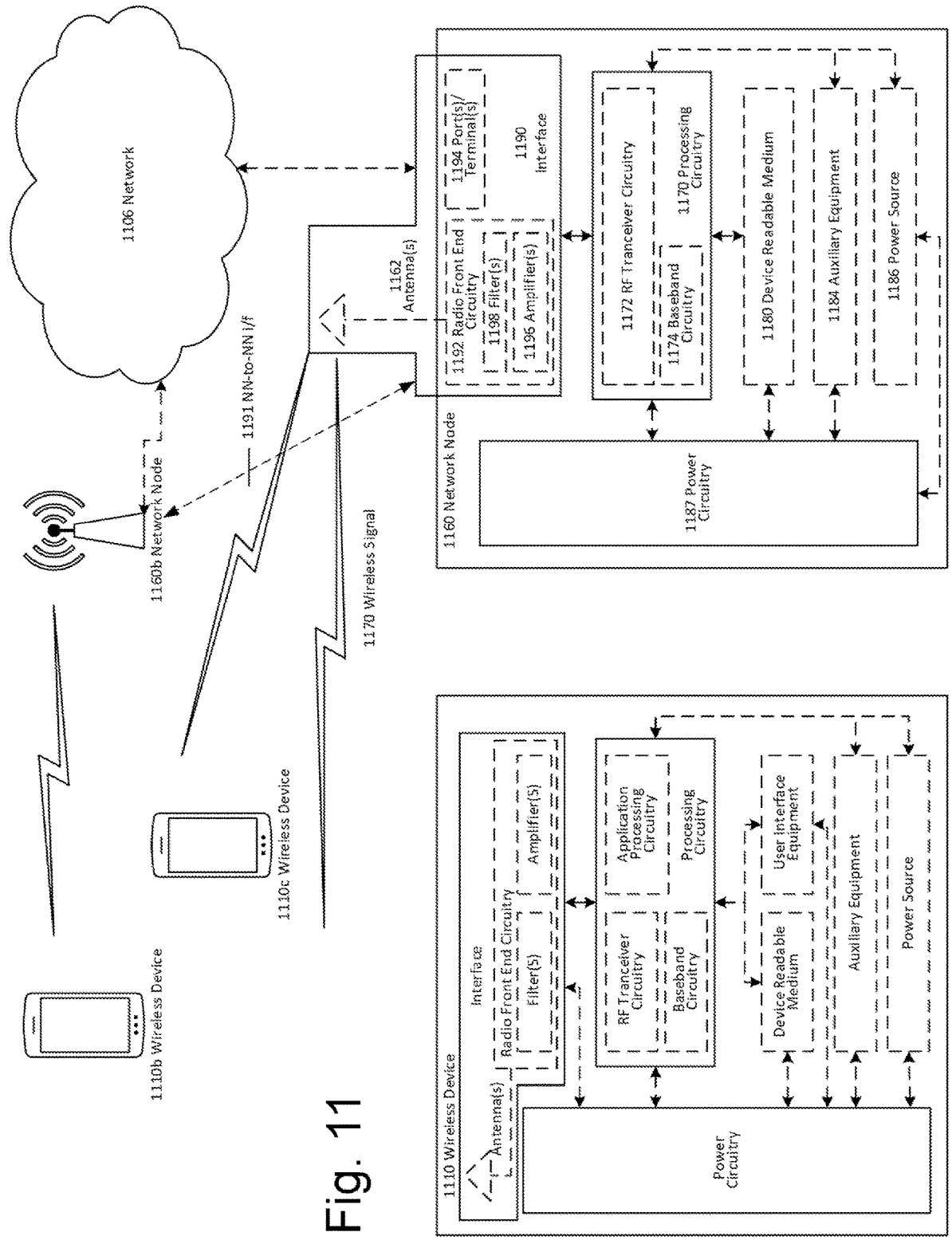
FIG. 11 is a block diagram illustrating a wireless network in accordance with some embodiments.

FIG. 11 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 is depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components. The components of network node 1160 are described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, based on their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160 but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network node 1160b, network 1106, and/or WDs 1110. As illustrated, interface 1190 comprises port(s)/terminal(s) 1194 to send and receive data, for example to and from network 1106, or to and from network node 1160b via a NN-to-NN interface 1191 (such as the Xn interface), over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna, interface, processing circuitry, device readable medium, user interface equipment, auxiliary equipment, power source and power circuitry. WD 1110 may include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies may be integrated into the same or different chips or set of chips as other components within WD 1110.

Figure 12:
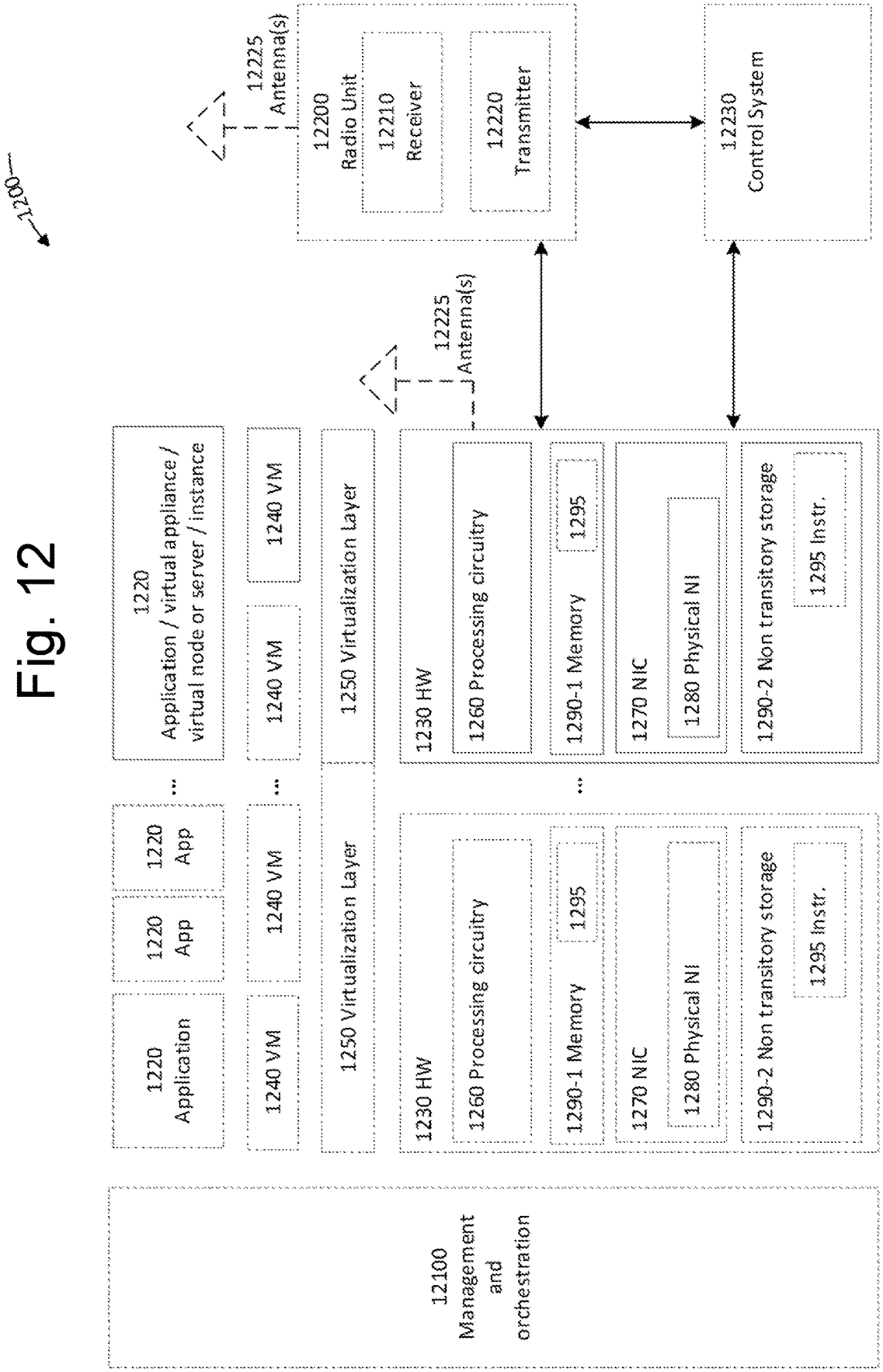
FIG. 12 is a block diagram illustrating a virtualization environment in which functions implemented by some embodiments may be virtualized.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be affected with the use of control system 12230 which may alternatively be used for communication between the hardware nodes 1230 and radio units 12200.

FIG. 13a depicts a method performed by a receiving network node, 1160, 1160b, for CLI mitigation. The method comprises receiving 1310, from at least one sending network node, a time division duplex configuration of the at least one sending network node, the time division duplex configuration identifying:

- at least one slot of the time division duplex configuration as either a fixed uplink slot for which all symbols are for uplink transmission or a fixed downlink slot for which all symbols are for downlink transmission; and
- at least one slot of the time division duplex configuration as a flexible slot for which at least one symbol has an undefined transmission direction and the remaining symbols of the slot, if any, have a defined transmission direction which is either uplink or downlink.

The method further comprises adapting 1320 operations in a cell based on the received time division duplex configuration for mitigating CLI with the at least one sending network node.

In embodiments, adapting 1320 operations in the cell may comprise at least one of: scheduling 1804 a transmission or channel; configure channel resources; and configure interference measurement resources.

In embodiments, the method may further comprise performing at least one measurement on the configured interference measurement resources to estimate CLI levels.

In embodiments, adapting operations may further comprise determining a slot or symbol in the cell that will not be affected by CLI with the at least one sending network node, and adapting operations based on the determined slot or symbol. Determining the slot in the cell that will not be affected by CLI may comprise: determining the slot in the cell to correspond to a slot identified as a fixed uplink or downlink slot of the time division duplex configuration. Adapting operations based on the determined slot may comprise scheduling an uplink transmission when the determined slot corresponds to a slot identified as a fixed uplink slot of the time division duplex configuration and scheduling a downlink transmission when the determined slot corresponds to a slot identified as fixed downlink slot of the time division duplex configuration.

In embodiments, the time division duplex configuration is received via a backhaul connection between the receiving and sending network node.

In embodiments, the time division duplex configuration is received over an F1 interface or an Xn interface between the receiving and sending network node.

In embodiments, the time division duplex configuration is received in a message listing the slots of the time division duplex configuration, each of the listed slots being identified by an index. Symbols within each of the listed slots may be indicated to be one of: all downlink symbols identifying the slot as a fixed downlink slot, all uplink symbols identifying the slot as a fixed uplink slot, and a combination of downlink symbols, uplink symbols, and symbols with undefined transmission direction identifying the slot as a flexible slot. In one embodiment, the message listing the slots is of the message format proposed above: Intended-TDD-UL-DL-Config IE.

FIG. 13b depicts a method performed by a sending network node, 1160, 1160b, for CLI mitigation. The method comprises determining 1330 a time division duplex configuration of the sending network node. The time division duplex configuration identifies at least one slot of the time division duplex configuration as either a fixed uplink slot for which all symbols are for uplink transmission or a fixed downlink slot for which all symbols are for downlink transmission; and at least one slot of the time division duplex configuration as a flexible slot for which at least one symbol has an undefined transmission direction and the remaining symbols of the slot, if any, have a defined transmission direction which is either uplink or downlink transmission. The method further comprises sending 1340, to at least one receiving network node, the determined time division duplex configuration, for enabling CLI mitigation by the at least one receiving network node.

In embodiments, the time division duplex configuration may be determined based on a cell-specific time division duplex configuration of the sending node. Alternatively, or additionally, the time division duplex configuration may be determined based on at least one of a synchronization signal block and a random access transmission configuration.

In embodiments, the time division duplex configuration may be sent via a backhaul connection between the sending and receiving network node.

In embodiments, the time division duplex configuration may be sent over an F1 interface or an Xn interface between the sending and receiving network node.

In embodiments, the time division duplex configuration may be sent in a message listing the slots of the time division duplex configuration, each of the listed slots being identified by an index. Symbols within each of the listed slots may be indicated to be one of: all downlink symbols identifying the slot as a fixed downlink slot, all uplink symbols identifying the slot as a fixed uplink slot, and a combination of downlink symbols, uplink symbols, and symbols with undefined transmission direction identifying the slot as a flexible slot.

FIG. 13c depicts a method by a base station for CLI mitigation, according to certain embodiments. Boxes with dashed lines indicate optional steps. At step 1802, the base station receives, from at least one other base station, information associated with identifying the at least one time resource of the other base station as a fixed time resource and/or a flexible time resource. Based on the information received from the at least one other base station, the base station schedules a transmission or channel to mitigate the CLI at step 1804.

Figure 13D:
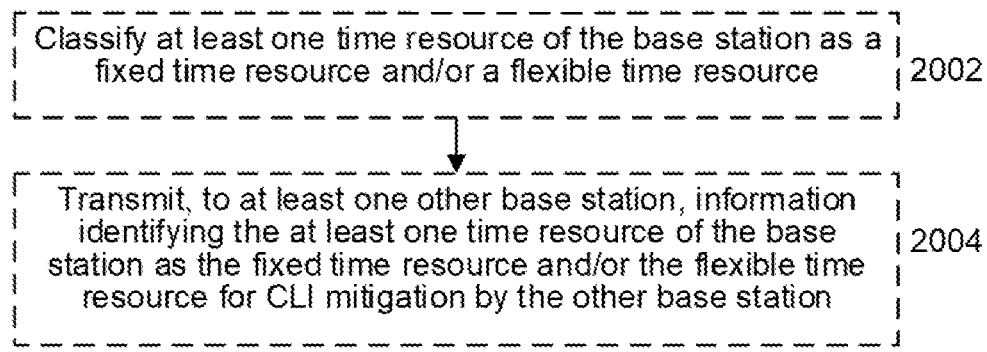

FIG. 13d depicts another method by a base station for CLI mitigation, according to certain embodiments. Boxes with dashed lines indicate optional steps. At step 2002, the base station classifies at least one time resource of the base station as a fixed time resource and/or a flexible time resource. At step 2004, the base station transmits, to at least one other base station, information identifying the at least one time resource of the base station as the fixed time resource and/or the flexible time resource for performance of CLI mitigation by the at least one other base station.

Figure 14A:
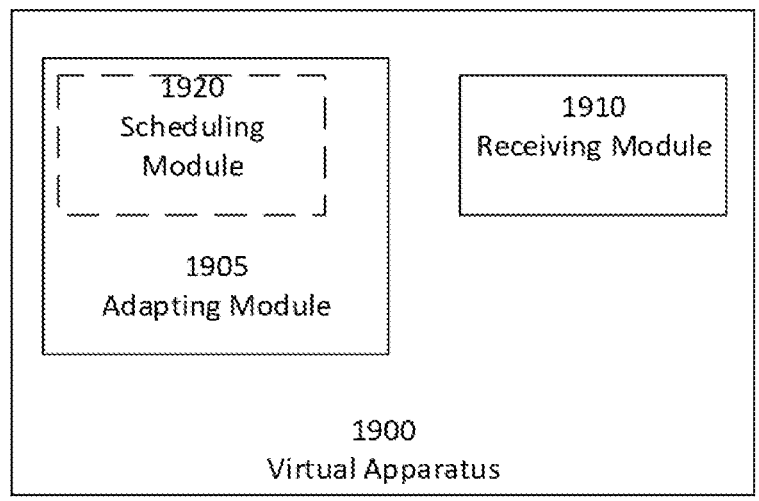
FIGS. 14a-b are block diagrams illustrating virtual apparatus according to embodiments.

FIG. 14a illustrates a schematic block diagram of a virtual apparatus 1900 in a wireless network (for example, the wireless network shown in FIG. 11). The apparatus may be implemented in a network node (e.g., network node 1160 shown in FIG. 11). Apparatus 1900 is operable to carry out the example method described with reference to FIGS. 13a and 13c and possibly any other processes or methods disclosed herein. Boxes with dashed lines indicate optional modules. It is also to be understood that the method of FIG.

13a or 13c is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1910, adapting module 1905, optional scheduling module 1920, and any other suitable units of apparatus 1900 to perform corresponding functions according to one or more embodiments of the present disclosure.

According to certain embodiments, receiving module 1910 may perform certain of the receiving functions of the apparatus 1900. For example, receiving module 1910 may receive, from at least one other base station, information identifying the at least one time resource of the other base station as a fixed time resource and/or a flexible time resource; or receiving module 1910 may receive from at least one sending network node, a time division duplex configuration of the at least one sending network node, the time division duplex configuration identifying: at least one slot of the time division duplex configuration as either a fixed uplink slot for which all symbols are for uplink transmission or a fixed downlink slot for which all symbols are for downlink transmission; and at least one slot of the time division duplex configuration as a flexible slot for which at least one symbol has an undefined transmission direction and the remaining symbols of the slot, if any, have a defined transmission direction which is either uplink or downlink.

According to certain embodiments, adapting module 1905 may perform certain of the adapting functions of the apparatus 1900. For example, adapting module 1905 may adapt operations in a cell based on the received time division duplex configuration for mitigating CLI with the at least one sending network node. According to certain embodiments, the adapting module 1905 may comprise a scheduling module 1920 that may perform certain of the scheduling functions of the apparatus 1900. For example, scheduling module 1920 may schedule a transmission or channel to mitigate the CLI based on the information received from the at least one other base station.

Figure 14B:
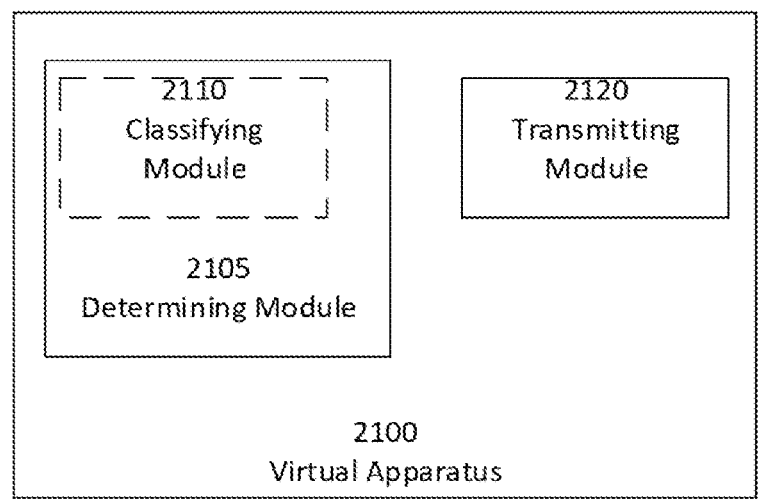

FIG. 14b illustrates a schematic block diagram of a virtual apparatus 2100 in a wireless network (for example, the wireless network shown in FIG. 11). The apparatus may be implemented in a network node (e.g., network node 1160 shown in FIG. 11). Boxes with dashed lines indicate optional modules. Apparatus 2100 is operable to carry out the example method described with reference to FIG. 13b or 13d and possibly any other processes or methods disclosed herein. It is also to be understood that the method of FIG. 13b or 13d is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 2105, classifying module 2110, transmitting module 2120, and any other suitable units of apparatus 2100 to perform corresponding functions according one or more embodiments of the present disclosure.

According to certain embodiments, determining module 2105 may perform certain of the determining functions of the apparatus 2100. For example, determining module 2105 may determine a time division duplex configuration of the sending network node, the time division duplex configuration identifying: at least one slot of the time division duplex configuration as either a fixed uplink slot for which all symbols are for uplink transmission or a fixed downlink slot for which all symbols are for downlink transmission; and at least one slot of the time division duplex configuration as a flexible slot for which at least one symbol has an undefined transmission direction and the remaining symbols of the slot, if any, have a defined transmission direction which is either uplink or downlink transmission. According to certain embodiments, the determining module 2105 may comprise a classifying module 2110 that may perform certain of the classifying functions of the apparatus 2100. For example, classifying module 2110 may classify at least one time resource of the base station as a fixed time resource and/or a flexible time resource.

According to certain embodiments, transmitting module 2120 may perform certain of the transmitting functions of the apparatus 2100. For example, transmitting module 2120 may transmit, to at least one other base station, information identifying the at least one time resource of the base station as the fixed time resource and/or the flexible time resource for performance of CLI mitigation by the at least one other base station; or the transmitting module 2120 may send to at least one receiving network node, the determined time division duplex configuration, for enabling CLI mitigation by the at least one receiving network node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Group A Embodiments

1. A method performed by a base station, e.g. for cross-link interference (CLI) mitigation, the method comprising one or more of:
    receiving, from at least one other base station, information associated with identifying at least one time resource of the other base station as a fixed time resource and/or a flexible time resource, optionally the information comprising a cell-specific TDD configuration and/or an intended usage of a flexible time resource for a downlink and/or uplink transmission; and based on or in association with the information received from the at least one other base station, scheduling a transmission or channel to mitigate the CLI.

2. The method of Embodiment 1, wherein the cell-specific TDD configuration or fixed time resource and/or the intended usage of a flexible time resource for the downlink and/or uplink transmission is received in single transmission from the at least one other base station.

3. The method of Embodiment 2, wherein symbols within each slot or some slots defined by a slotConfigList or other similar parameter can be either all downlink, all uplink, or a combination with some flexible symbols.

4. The method of Embodiment 2, wherein only slots with flexible symbols are exchanged in the single transmission from the at least one other base station.

5. The method of Embodiment 1, wherein the cell-specific TDD configuration or fixed time resource is received in a first message from the at least one base station and the intended usage of the flexible time resource for the downlink and/or uplink transmission is received in a second message from the at least one base station, wherein, optionally, the first message and second message can be received with different periodicities.

6. The method of Embodiment 5, wherein the first message comprising the cell-specific TDD configuration or fixed time resource is received when the cell-specific TDD configuration or fixed time resource is updated in SIB1.

7. The method of any one of Embodiments 5 to 6, wherein intended usage comprises an intended/planned fixed and/or flexible resources classification within the SIB-1 configured flexible resources.

8. The method of any one of Embodiments 5 to 7, wherein the first message comprises one or more concatenated TDD UL-DL pattern structures, e.g. by specifying one or more of: a number of consecutive full DL slots at a beginning of the TDD pattern, a number of consecutive DL symbols in the slot following the full DL slots, a number of UL symbols in the end of the slot preceding the first full UL slot, and a number of consecutive full UL slots at the end of the TDD pattern.

9. The method of Embodiment 8, wherein the first base station determines that any remaining symbols/slots are flexible symbols/slots.

10. The method of any one of Embodiments 5 to 9, wherein the second message defines an override of the flexible symbols/slots in the first message.

11. The method of any one of Embodiments 1 to 10, wherein the cell-specific TDD configuration or fixed time resource is represented by a bitmap.

12. The method of any one of Embodiments 1 to 11, wherein the cell-specific TDD configuration or fixed time resource is indicated by means of an analytical description.

13. The method of any one of Embodiments 1 to 12, wherein the information indicates that a SIB1-configured flexible symbol or slot that is associated with a SSB transmission is a fixed DL resource.

14. The method of any one of Embodiments 1 to 13, wherein the information indicates that a SIB1-configured flexible symbol or slot that is associated with a PRACH transmission is a fixed UL resource.

15. The method of any one of Embodiments 1 to 14, wherein the information comprises position information associated with at least one UE.

16. The method of any one of Embodiments 1 to 15, wherein the at least one time resource is categorized as a fixed time resource comprising at least one of:

an uplink resource for use only for uplink transmissions and/or receptions;

a downlink resource for use only for downlink transmissions and/or receptions; and a reserved resource not to be used for communications.

17. The method of any one of Embodiments 1 to 16, wherein:

the at least one resource comprises at least one slot; and the information indicates each slot as either the fixed time resource or the flexible time resource.

18. The method of any one of Embodiments 1 to 16, wherein:

the at least one resource comprises at least one symbol; and the information indicates each symbol as either the fixed time resource or the flexible time resource.

19. The method of any one of Embodiments 1 to 18, wherein the information is received via a backhaul connection between the base station and the at least one other base station.

20. The method of any one of Embodiments 1 to 18, wherein the information is received via a F1 interface.

21. The method of any one of Embodiments 1 to 19, wherein the cell-specific TDD configuration or fixed time resource is a semi-static time division duplex configuration.

22. The method of any one of Embodiments 1 to 21, wherein the information comprises a change in information relative to a common reference TDD configuration.

23. The method of any one of Embodiments 1 to 18, wherein the information is received over an Xn interface.

24. The method of any one of Embodiments 1 to 18, wherein the information is received from the at least one other base station via a core network.

25. The method of any one of Embodiments 1 to 24, further comprising:

transmitting, to the at least one other base station, information associated with identifying at least one time resource of the base station as a fixed time resource and/or a flexible time resource.

26. The method of any one of Embodiments 1 to 25, further comprising:

updating a semi-static time division duplex configuration of the base station based on the information received from the at least one other base station.

27. The method of any one of Embodiments 1 to 26, wherein information indicates that the at least one time resource has changed from the fixed time resource to the flexible time resource.

28. The method of any one of Embodiments 1 to 26, wherein information indicates that the at least one time resource has changed from the flexible time resource to the fixed time resource.

29. The method of any one of Embodiments 1 to 28, wherein scheduling the transmission or channel to mitigate the CLI comprises at least one of:
   protecting the transmission or channel by scheduling or configuring the transmission or channel with at least one resource that will not be affected by CLI; and
   configuring a PRACH resource or other important uplink traffic.
30. The method of any one of Embodiments 1 to 29, further comprising configuring interference measurement resources based on the information.
31. The method of any one of Embodiments 1 to 30, further comprising
   performing at least one measurement on a slot or symbol that is predicted to be CLI-free.

Group B Embodiments

32. A method performed by a base station for cross-link interference (CLI) mitigation, the method comprising one or more of:
   classifying at least one time resource of the base station as a fixed time resource and/or a flexible time resource; and
   transmitting, to at least one other base station, information associated with identifying the at least one time resource of the base station as the fixed time resource and/or the flexible time resource for performance of CLI mitigation by the at least one other base station, optionally the information comprising a cell-specific TDD configuration or fixed time resource and an intended usage of a flexible time resource for a downlink and/or uplink transmission.
33. The method of Embodiment 18, wherein transmitting the information identifying the at least one time resource as the fixed time resource and/or the flexible time resource comprising transmitting the information to a plurality of other base stations.
34. The method of any one of Embodiments 32 to 33, wherein the cell-specific TDD configuration or fixed time resource and the intended usage of a flexible time resource for the downlink and/or uplink transmission is transmitted in single transmission to the at least one other base station.
35. The method of Embodiment 34, wherein symbols within each slot defined by a slotConfigList or another message can be either all downlink, all uplink, or a combination with some flexible symbols.
36. The method of Embodiment 34, wherein only slots with flexible symbols are exchanged in the single transmission to the at least one other base station.
37. The method of Embodiment 32, wherein the cell-specific TDD configuration or fixed time resource is transmitted to the at least one base station in a first message and/or the intended usage of the flexible time resource for the downlink and/or uplink transmission is transmitted to the at least one base station in a second message, wherein, optionally, the first message and second message can be received with different periodicities.
38. The method of Embodiment 37, wherein the first message comprising the cell-specific TDD configuration or fixed time resource is transmitted when the cell-specific TDD configuration or fixed time resource is update in SIB1.
39. The method of any one of Embodiments 37 to 38, wherein intended usage comprises an intended/planned fixed and flexible resources classification within the SIB-1 configured flexible resources.
40. The method of any one of Embodiments 37 to 39, wherein the first message comprises one or more concatenated TDD UL-DL pattern structures by specifying a number of consecutive full DL slots at a beginning of the TDD pattern, a number of consecutive DL symbols in the slot following the full DL slots, a number of UL symbols in the end of the slot preceding the first full UL slot, and a number of consecutive full UL slots at the end of the TDD pattern.
41. The method of Embodiment 40, wherein the first base station determines that any remaining symbols/slots are flexible symbols/slots.
42. The method of any one of Embodiments 37 to 41, wherein the second message defines an override of the flexible symbols/slots in the first message.
43. The method of any one of Embodiments 32 to 42, wherein the cell-specific TDD configuration or fixed time resource is represented by a bitmap.
44. The method of any one of Embodiments 32 to 42, wherein the cell-specific TDD configuration or fixed time resource is indicated by means of an analytical description.
45. The method of any one of Embodiments 32 to 44, wherein the information indicates that a SIB1-configured flexible symbol or slot that is associated with a SSB transmission is a fixed DL resource.
46. The method of any one of Embodiments 32 to 45, wherein the information indicates that a SIB1-configured flexible symbol or slot that is associated with a PRACH transmission is a fixed UL resource.
47. The method of any one of Embodiments 32 to 46, wherein the information comprises position information associated with at least one UE.
48. The method of any one of Embodiments 32 to 47, wherein the at least one time resource is categorized as a fixed time resource comprising at least one of:
   an uplink resource for use only for uplink transmissions and/or receptions;
   a downlink resource for use only for downlink transmissions and/or receptions; and
   a reserved resource not to be used for communications.
49. The method of any one of Embodiments 32 to 48, wherein:
   the at least one resource comprises a plurality of slots; and
   classifying the at least one time resource of the base station as the fixed time resource and/or the flexible time resource comprises classifying each of the plurality of slots as either the fixed time resource or the flexible time resource.
50. The method of any one of Embodiments 32 to 49, wherein:
   the at least one resource comprises a plurality of symbols; and
   classifying the at least one time resource of the base station as the fixed time resource and/or the flexible time resource comprises classifying each of the plurality of symbols as either the fixed time resource or the flexible time resource.
51. The method of any one of Embodiments 32 to 50, wherein the information is transmitted via a backhaul connection between the base station and the at least one other base station.

52. The method of any one of Embodiments 32 to 50, wherein the information is transmitted via a F1 interface.
53. The method of any one of Embodiments 32 to 52, wherein the cell-specific TDD configuration or fixed time resource is a semi-static time division duplex configuration.
54. The method of any one of Embodiments 32 to 53, wherein the information comprises a change in information relative to a common reference TDD configuration.
55. The method of any one of Embodiments 32 to 54, wherein the information is transmitted over an Xn interface.
56. The method of any one of Embodiments 32 to 55, wherein the information is transmitted to the at least one other base station via a core network.
57. The method of any one of Embodiments 32 to 56, further comprising:
   receiving, from the at least one other base station, information identifying at least one time resource of the at least one other base station as a fixed time resource and/or a flexible time resource.
58. The method of Embodiment 57, further comprising: updating a semi-static time division duplex configuration of the base station based on the information received from the at least one other base station.
59. The method of any one of Embodiments 57 to 58, wherein the at least one time resource of the base station is classified as the fixed time resource and/or the flexible time resource based on at least one of:
   the information received from the at least one other base station, and
   the updated semi-static time division duplex configuration of the base station.
60. The method of any one of Embodiments 32 to 59, wherein information indicates that the at least one time resource has changed from the fixed time resource to the flexible time resource.
61. The method of any one of Embodiments 32 to 60, wherein information indicates that the at least one time resource has changed from the flexible time resource to the fixed time resource.
62. The method of any one of Embodiments 32 to 61, further comprising based on at least one of the classifying of the at least one resource as the flexible time resource and/or the flexible time resource performing at least one action, the at least one action comprising:
   protecting a channel/signal by scheduling or configuring the channel/signal with at least one resource that will not be affected by CLI;
   configuring a PRACH resource or other important uplink traffic;
   configure interference measurement resources; and/or
   perform at least one measurement on a slot or symbol that is predicted to be CLI-free.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure.

ABBREVIATIONS

At least some of the following abbreviations may be used in this disclosure. If there is an inconsistency between abbreviations, preference should be given to how it is used above.

3GPP 3rd Generation Partnership Project
5G 5th Generation
CLI Cross-link Interference
CN Core Network
CP Cyclic Prefix
CRC Cyclic Redundancy Check
CSI Channel State Information
DCCH Dedicated Control Channel
DCI Downlink Control Information
DL Downlink
DMRS Demodulation Reference Signal
E-CID Enhanced Cell-ID (positioning method)
eNB E-UTRAN NodeB
eIMTA enhanced Interference Mitigation and Traffic Adaptation
E-SMLC evolved Serving Mobile Location Center
E-UTRA Evolved Universal Terrestrial Radio Access
E-UTRAN E-UTRA Network
FDD Frequency Division Duplex
FFS For Further Study
gNB gNode B (a base station in NR; a Node B supporting NR and connectivity to NGC)
GP Guard Period
GSM Global System for Mobile communication
LOS Line of Sight
LTE Long-Term Evolution
MME Mobility Management Entity
MSC Mobile Switching Center
NGC Next Generation Core
NN Network Node
NR New Radio
OFDM Orthogonal Frequency Division Multiplexing
OFDMA Orthogonal Frequency Division Multiple Access
OSS Operations Support System
PDCCH Physical Downlink Control Channel
PDSCH Physical Downlink Shared Channel
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
RAT Radio Access Technology
RB Resource Block
RNC Radio Network Controller
RNTI Radio Network Temporary Identifier
RRC Radio Resource Control
RS Reference Signal
RSRP Reference Symbol Received Power OR Reference Signal Received Power RSSI Received Signal Strength Indicator
SCS Subcarrier Spacing
SF Subframe
SFI Slot Format Indicator
SI System Information
SIB System Information Block
SON Self Optimized Network
SRS Sounding Reference Signal
SS Synchronization Signal
SSS Secondary Synchronization Signal
TDD Time Division Duplex
UE User Equipment
UL Uplink
UMTS Universal Mobile Telecommunication System
UTRA Universal Terrestrial Radio Access
UTRAN Universal Terrestrial Radio Access Network
WCDMA Wideband CDMA
WLAN Wide Local Area Network

The invention claimed is:

1. A method performed by a receiving network node for cross-link interference, CLI, mitigation, the method comprising:
receiving, from at least one sending network node, a time division duplex configuration for a plurality of slots of the at least one sending network node in a message listing the slots of the time division duplex configuration, each of the listed slots being identified by an index, the time division duplex configuration identifying:
at least one slot of the time division duplex configuration as either a fixed uplink slot for which all symbols are for uplink transmission or a fixed downlink slot for which all symbols are for downlink transmission; and
at least one slot of the time division duplex configuration as a flexible slot for which at least one symbol has an undefined transmission direction and the remaining symbols of the slot, if any, have a defined transmission direction which is either uplink or downlink;
adapting operations in a cell based on the received time division duplex configuration for mitigating CLI with the at least one sending network node.

2. The method of claim 1, wherein adapting operations in the cell comprises at least one of: scheduling a transmission or channel; configuring channel resources; and configuring interference measurement resources.

3. The method of claim 2, further comprising performing at least one measurement on the configured interference measurement resources to estimate CLI levels.

4. The method of claim 1, wherein adapting operations further comprises determining a slot or symbol in the cell that will not be affected by CLI with the at least one sending network node, and adapting operations based on the determined slot or symbol.

5. The method of claim 4, wherein determining the slot in the cell that will not be affected by CLI comprises: determining the slot in the cell to correspond to a slot identified as a fixed uplink or downlink slot of the time division duplex configuration, and wherein adapting operations based on the determined slot comprises scheduling an uplink transmission when the determined slot corresponds to a slot identified as a fixed uplink slot of the time division duplex configuration and scheduling a downlink transmission when the determined slot corresponds to a slot identified as fixed downlink slot of the time division duplex configuration.

6. The method of claim 1, wherein the time division duplex configuration is received via a backhaul connection between the receiving and sending network node.

7. The method of claim 1, wherein the time division duplex configuration is received over an F1 interface or an Xn interface between the receiving and sending network node.

8. The method of claim 1, wherein symbols within each of the listed slots are indicated to be one of: all downlink symbols identifying the slot as a fixed downlink slot, all uplink symbols identifying the slot as a fixed uplink slot, and a combination of downlink symbols, uplink symbols, and symbols with undefined transmission direction identifying the slot as a flexible slot.

9. A method performed by a sending network node for cross-link interference, CLI, mitigation, the method comprising:
determining a time division duplex configuration for a plurality of slots of the sending network node, the time division duplex configuration identifying:
at least one slot of the time division duplex configuration as either a fixed uplink slot for which all symbols are for uplink transmission or a fixed downlink slot for which all symbols are for downlink transmission; and
at least one slot of the time division duplex configuration as a flexible slot for which at least one symbol has an undefined transmission direction and the remaining symbols of the slot, if any, have a defined transmission direction which is either uplink or downlink transmission;
sending, to at least one receiving network node, the determined time division duplex configuration in a message listing the slots of the time division duplex configuration, each of the listed slots being identified by an index, for enabling CLI mitigation by the at least one receiving network node.

10. The method of claim 9, wherein the time division duplex configuration
is determined based on at least one of:
a cell-specific time division duplex configuration of the sending node;
a synchronization signal block; and
a random access transmission configuration.

11. The method of claim 9, wherein the time division duplex configuration is sent via a backhaul connection between the sending and receiving network node.

12. The method of claim 9, wherein the time division duplex configuration is sent over an F1 interface or an Xn interface between the sending and receiving network node.

13. The method of claim 9, wherein symbols within each of the listed slots are indicated to be one of: all downlink symbols identifying the slot as a fixed downlink slot, all uplink symbols identifying the slot as a fixed uplink slot, and a combination of downlink symbols, uplink symbols, and symbols with undefined transmission direction identifying the slot as a flexible slot.

14. A receiving network node configured for cross-link interference, CLI, mitigation, the receiving network node comprising communication circuitry configured to communicate with a sending network node, and processing circuitry operatively associated with the communication circuitry and configured to perform the following operations:
receive, from at least one sending network node, a time division duplex configuration for a plurality of slots of the at least one sending network node in a message listing the slots of the time division duplex configuration, each of the listed slots being identified by an index, the time division duplex configuration identifying:

at least one slot of the time division duplex configuration as either a fixed uplink slot for which all symbols are for uplink transmission or a fixed downlink slot for which all symbols are for downlink transmission; and at least one slot of the time division duplex configuration as a flexible slot for which at least one symbol has an undefined transmission direction and the remaining symbols of the slot, if any, have a defined transmission direction which is either uplink or downlink;

adapt operations in a cell based on the received time division duplex configuration for mitigating CLI with the at least one sending network node.

15. The receiving network node of claim 14, wherein processing circuitry operable to adapt operations in the cell comprises at least one of: processing circuitry operable to schedule a transmission or channel, processing circuitry operable to configure channel resources, and processing circuitry operable to configure interference measurement resources.

16. A sending network node configured for cross-link interference, CLI, mitigation, the sending network node comprising communication circuitry configured to communicate with a receiving network node, and processing circuitry operatively associated with the communication circuitry and configured to perform the following operations:

determine a time division duplex configuration for a plurality of slots of the sending node, the time division duplex configuration identifying:

at least one slot of the time division duplex configuration as either a fixed uplink slot for which all symbols are for uplink transmission or a fixed downlink slot for which all symbols are for downlink transmission; and at least one slot of the time division duplex configuration as a flexible slot for which at least one symbol has an undefined transmission direction and the remaining symbols of the slot, if any, have a defined transmission direction which is either uplink or downlink transmission;

send, to at least one receiving network node, the determined time division duplex configuration in a message listing the slots of the time division duplex configuration, each of the listed slots being identified by an index, for enabling CLI mitigation by the at least one receiving network node.

17. The sending network node of claim 16, wherein the time division duplex configuration is determined based on at least one of: a cell-specific time division duplex configuration of the sending node; a synchronization signal block; and a random access transmission configuration.

* * * * *